United States Patent
Dan et al.

(10) Patent No.: US 12,424,367 B2
(45) Date of Patent: Sep. 23, 2025

(54) CONTROL DEVICE AND VIBRATION PRESENTING APPARATUS

(71) Applicants: Toru Dan, Tokyo (JP); Thi Hong Thu Nguyen, Tokyo (JP)

(72) Inventors: Toru Dan, Tokyo (JP); Thi Hong Thu Nguyen, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 134 days.

(21) Appl. No.: 18/369,508

(22) Filed: Sep. 18, 2023

(65) Prior Publication Data

US 2024/0105373 A1 Mar. 28, 2024

(30) Foreign Application Priority Data

Sep. 20, 2022 (JP) ................................. 2022-149088
Aug. 4, 2023 (JP) ................................. 2023-127739

(51) Int. Cl.
| | | |
|---|---|---|
| *H01H 47/00* | (2006.01) | |
| *B06B 1/04* | (2006.01) | |
| *H01F 7/06* | (2006.01) | |
| *H01F 7/08* | (2006.01) | |

(52) U.S. Cl.
CPC ............. *H01F 7/064* (2013.01); *B06B 1/045* (2013.01); *H01F 7/081* (2013.01)

(58) Field of Classification Search
None
See application file for complete search history.

(56) References Cited

U.S. PATENT DOCUMENTS

| | | |
|---|---|---|
| 2010/0030914 A1 | 2/2010 | Sparks et al. |
| 2010/0309141 A1 | 12/2010 | Cruz-Hernandez et al. |
| 2014/0247227 A1 | 9/2014 | Jiang et al. |
| 2015/0332565 A1* | 11/2015 | Cho .................. H10N 30/20 310/317 |
| 2019/0033971 A1* | 1/2019 | Reynolds .............. G06F 3/0443 |

(Continued)

FOREIGN PATENT DOCUMENTS

| | | |
|---|---|---|
| JP | 2010-287232 A | 12/2010 |
| JP | 2021068259 A | 4/2021 |

OTHER PUBLICATIONS

European Patent Office, Extended European Search Report for European Patent Application No. EP23198034.3, dated Jan. 15, 2024, 9pp.

*Primary Examiner* — Stephen W Jackson
(74) *Attorney, Agent, or Firm* — The Roy Gross Law Firm, LLC; Roy D. Gross

(57) ABSTRACT

Provided is a control device controlling an electromagnetic actuator that drives an operation device, supported in an elastically vibratable manner by an elastic support part, in one direction of a vibration direction of the operation device to vibrate the operation device. The control device includes a circuit that applies a main driving signal to a coil of the electromagnetic actuator to start vibration of the operation device in response to a touch operation on the operation device, then applies a sub-driving signal to the coil to adjust an attenuation period of the vibration. The sub-driving signal has a variable voltage varying with an offset voltage, as a center value, offset from a zero voltage, and a waveform that indicates a variation in the variable voltage is a sine function curve or a cosine function curve.

10 Claims, 21 Drawing Sheets

(56) References Cited

U.S. PATENT DOCUMENTS

2021/0111654 A1      4/2021  Ishitani et al.
2021/0142629 A1*    5/2021  Karimi Eskandary  ..................... B06B 1/0644

* cited by examiner

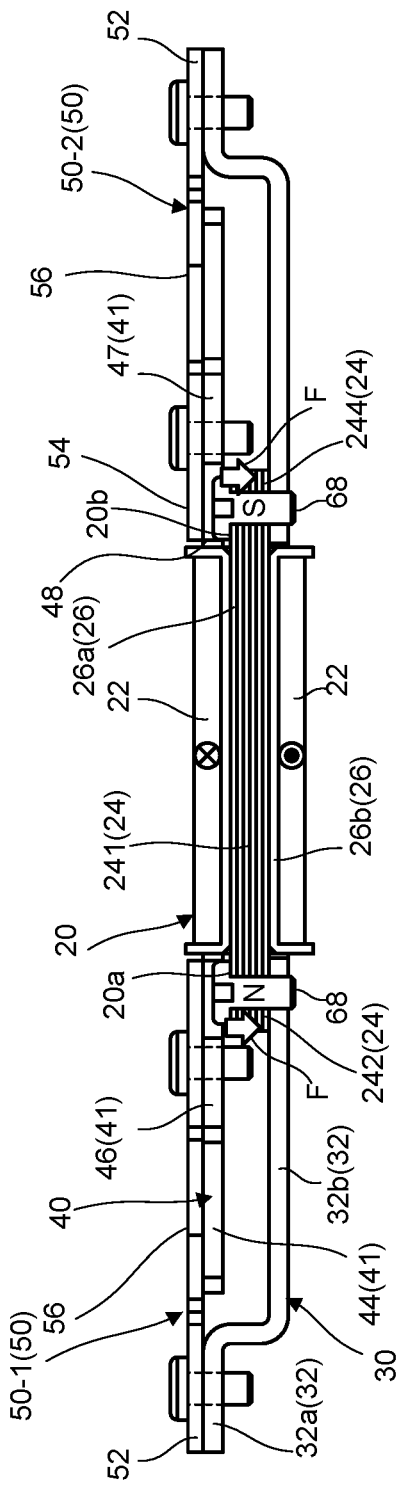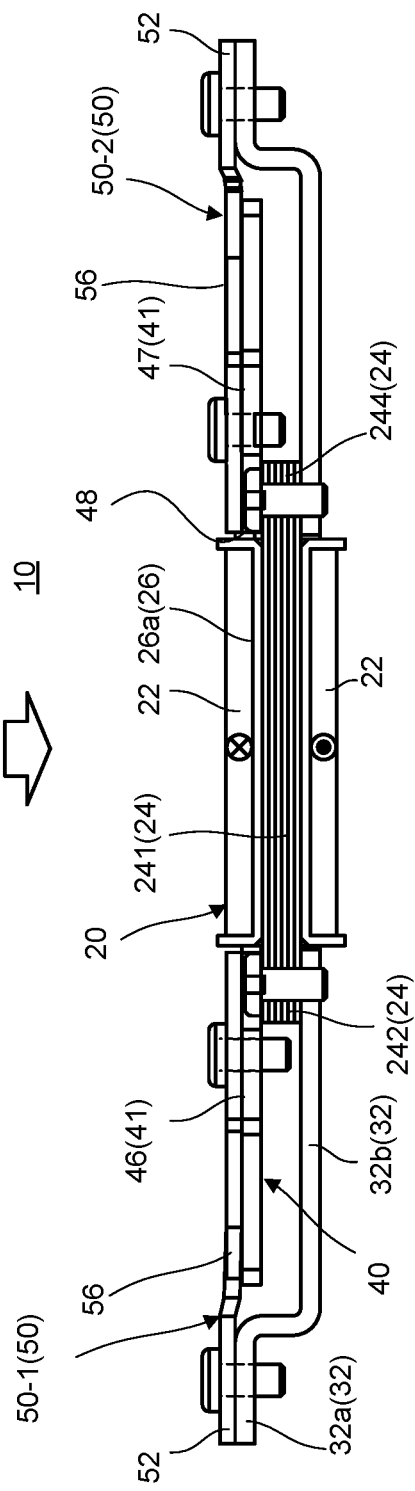

CONTROL DEVICE AND VIBRATION PRESENTING APPARATUS

CROSS REFERENCE TO RELATED APPLICATIONS

This application is entitled to (or claims) the benefit of Japanese Patent Application No. 2022-149088, filed on Sep. 20, 2022 and Japanese Patent Application No. 2023-127739, filed on Aug. 4, 2023, the disclosures of which including the specifications, drawings and abstracts are incorporated herein by reference in their entirety.

TECHNICAL FIELD

The present invention relates to a control device and a vibration presenting apparatus each driving an electromagnetic actuator.

BACKGROUND ART

In the related art, there is known a configuration in which, at the time of operating a touch screen that is an operation device, an electromagnetic actuator gives vibration as a touch operation feeling (a feeling of operation by touch) to a finger pulp or the like of an operator who comes into contact with a display screen displayed on the touch screen.

For example, Patent Literature (hereinafter, referred to as "PTL") 1 indicates a haptic interface device apparatus including: a touch screen; a biasing element which functions as an elastic support part; an electromagnetic actuator; and the like. In PTL 1, a control device that controls the electromagnetic actuator applies, as a voltage for driving the electromagnetic actuator, a main driving pulse for starting vibration, and then applies a kick-in pulse and/or a braking pulse to extend or shorten a vibration attenuation period.

CITATION LIST

Patent Literature

PTL 1
Japanese Patent Application Laid-Open No. 2010-287232

SUMMARY OF INVENTION

Technical Problem

In the haptic interface apparatus as indicated in PTL 1, a vibration attenuation period is extended or shortened by applying a main driving pulse and then by applying a kick-in pulse and/or a braking pulse of a square wave to a coil of the electromagnetic actuator. In a case where a pulse of a square wave is applied, however, a harmonic may be superimposed on an acceleration waveform of vibration due to, for example, a variation in a current flowing through the coil at the time of the application of the pulse or at the time of stopping the application (see FIGS. 14 and 15 to be described below). When a harmonic is superimposed on an acceleration waveform of vibration, a touch operation feeling due to the vibration becomes uncomfortable or an abnormal noise occurs. For this reason, it is desired to suppress the generation of such a harmonic.

The present invention has been made in view of such a problem, and an object of the present invention is to provide a control device and a vibration presenting apparatus each capable of suppressing the generation of a harmonic when adjusting a vibration attenuation period after starting vibration of an operation device.

Solution to Problem

To achieve the above-described object, a control device of the present invention controls an electromagnetic actuator that drives an operation device, which is supported in an elastically vibratable manner by an elastic support part, in one direction of a vibration direction of the operation device to vibrate the operation device. The control device includes a circuit that applies a main driving signal to a coil of the electromagnetic actuator to start vibration of the operation device in response to a touch operation on the operation device, and then applies a sub-driving signal to the coil to adjust an attenuation period of the vibration. The sub-driving signal has a variable voltage that varies with an offset voltage, as a center value, offset from a zero voltage, and a waveform that indicates a variation in the variable voltage is a sine function curve or a cosine function curve.

To achieve the above-described object, a vibration presenting apparatus of the present invention includes: an electromagnetic actuator that drives an operation device, which is supported in an elastically vibratable manner by an elastic support part, in one direction of a vibration direction of the operation device to vibrate the operation device; and the control device described above.

Advantageous Effects of Invention

According to the present invention, it is possible to suppress the generation of a harmonic when adjusting a vibration attenuation period after starting vibration of an operation device.

BRIEF DESCRIPTION OF DRAWINGS

FIG. 9A is a diagram provided for describing an operation of the same electromagnetic actuator;

FIG. 9B is a diagram provided for describing an operation of the same electromagnetic actuator;

DESCRIPTION OF EMBODIMENTS

Hereinafter, an embodiment of the present invention will be described in detail with reference to the accompanying drawings.

In the present embodiment, an orthogonal coordinate system (X, Y, Z) will be used for description. The drawings to be described later are also illustrated with the common orthogonal coordinate system (X, Y, Z). Hereinafter, the width, depth, and height of vibration presenting apparatus 200 including control device 1 are lengths in the X, Y, and Z directions, respectively, and correspondingly the width, depth, and height of electromagnetic actuator 10 are also lengths in the X, Y, and Z direction, respectively. Further, the plus side in the Z direction is a direction in which vibration feedback is given to the operator, which will be described as "the upper side". The minus side in the Z direction is a direction in which the operator performs pressing when performing an operation, which will be described as "the lower side".

<Basic Configuration of Vibration Presenting Apparatus 200 Using Control Device 1>

Figure 1:
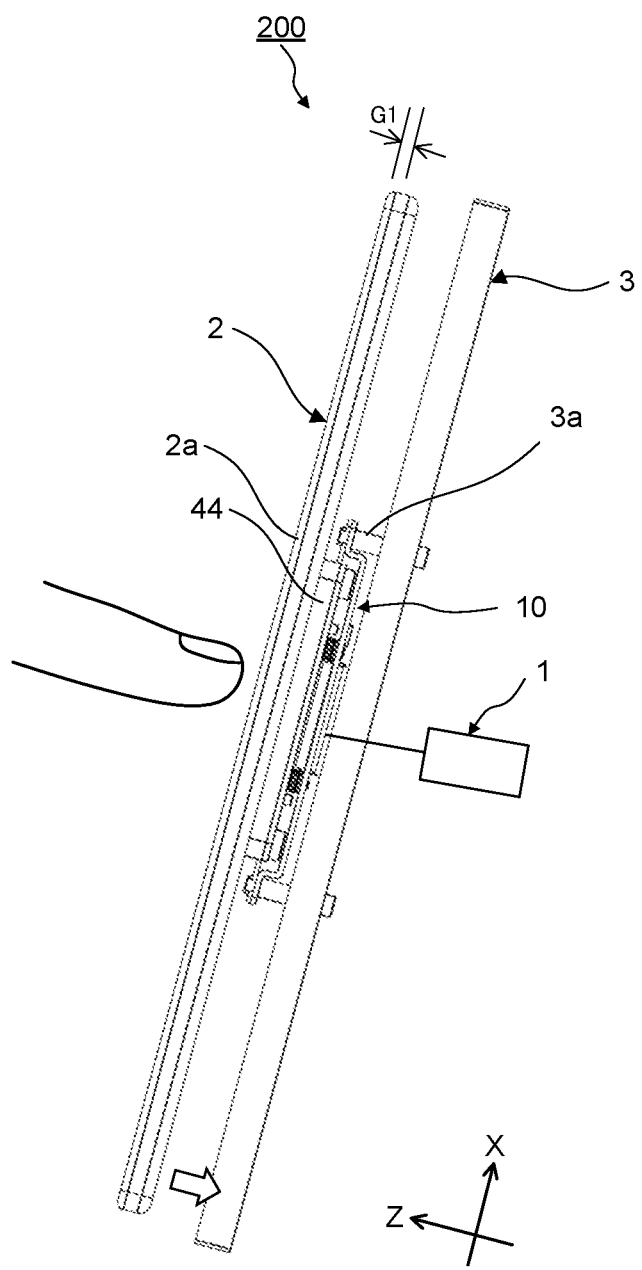
FIG. 1 is a side view of a vibration presenting apparatus including a control device according to an embodiment of the present invention.

Vibration presenting apparatus 200 illustrated in FIG. 1 includes control device 1, electromagnetic actuator 10 that is driven and controlled by control device 1, an operation device (touch screen 2) on which the operator performs a touch operation, and the like. Vibration presenting apparatus 200 gives vibration to the operation device in response to a touch operation of the operator on the operation device. That is, vibration presenting apparatus 200 gives a touch operation feeling (also referred to as "haptic feeling") to the operator, who comes into contact with and operates the operation device, via the operation device.

In the present embodiment, the operation device is touch screen 2 that displays an image on a screen and is operated by a touch with the screen. Touch screen 2 is a touch screen of an electrostatic type, a resistive film type, an optical type, or the like. Touch screen 2 detects a touch position of the operator. Touch screen 2 is controlled by control device 1. Control device 1 is capable of obtaining information on a touch position of the operator via a touch screen control part (not illustrated). Further, the screen of touch screen 2 may be formed of a display part of a liquid crystal system, an organic EL system, an electronic paper system, a plasma system, or the like, and may be controlled by control device 1. Control device 1 controls a display information control part (not illustrated) to causes an image corresponding to the type of presented vibration to be displayed on the screen for the operator.

Note that, here, control device 1 acquires information on a touch position of the operator, causes an image corresponding to the type of presented vibration to be displayed, or the like, but a microcomputer as a control device different from control device 1 may be provided, and the microcomputer may connect between control device 1 and touch screen 2. In this case, the microcomputer acquires information on a touch position of the operator via the touch screen control unit, and controls the display information control part to causes an image corresponding to the type of presented vibration to be displayed on the screen for the operator, and the like. Further, the microcomputer may output information (such as waveform data) on vibration in response to acquired information on a touch position of the operator to control device 1 and/or may output a trigger signal, which will be described with FIG. 11 to be described later, to control device 1. Note that, the microcomputer is formed of, for example, a semiconductor chip.

Vibration presenting apparatus 200 is used, for example, as a touch screen apparatus of an automotive navigation system as an electronic device. Vibration presenting apparatus 200 functions as an apparatus that presents vibration to the operator who comes into contact with and operates screen 2a of touch screen 2. At this time, vibration presenting apparatus 200 may be any electronic device that gives a haptic feeling to the operator by presenting vibration to the operator who comes into contact with a vibration object. For example, vibration presenting apparatus 200 may be an image display apparatus such as a smartphone, a tablet computer, and a TV; a game machine with a touch screen; a game controller with a touch screen, or the like.

In the present embodiment, in vibration presenting apparatus 200, when a finger pulp or the like of the operator comes into contact with and operates screen 2a of touch screen 2, control device 1 causes electromagnetic actuator 10 to be driven and causes electromagnetic actuator 10 to vibrate in response to the operation. This vibration gives a haptic feeling to the operator. Control device 1 of the present embodiment causes various types of haptic feelings to be given in response to display images operated by the operator. For example, control device 1 causes a haptic feeling as a mechanical switch such as a tactile switch, an alternate type switch, a momentary switch, a toggle switch, a sliding switch, a rotary switch, a DIP switch, and a rocker switch to be given. Further, in a push type switch, control device 1 is also capable of causing haptic feelings of the switch with different push-in degrees to be given.

Note that, in vibration presenting apparatus 200, an operation device, which does not have a display function and can be operated by the operator by simply coming into contact therewith, may be used instead of touch screen 2 as the operation device.

In vibration presenting apparatus 200 illustrated in FIG. 1, electromagnetic actuator is disposed between touch screen 2 and base 3 as an apparatus rear surface part disposed on a side of the rear surface of touch screen 2. Control device 1 may be provided in electromagnetic actuator 10 itself or base 3.

Touch screen 2, on the side of the rear surface thereof, is fixed to surface-part fixing part 44 of movable body 40 (see FIG. 2) of electromagnetic actuator 10. Further, base 3 is disposed to face touch screen 2, and fixing body 30 (see FIG. 2) of electromagnetic actuator 10 is fixed to base 3 via pillar parts 3a. Thus, electromagnetic actuator 10 is disposed between a center portion of touch screen 2 and a center portion of base 3 so as to connect each other.

Touch screen 2 itself is driven integrally with movable body 40 of electromagnetic actuator 10. When the operator presses and operates the screen of touch screen 2, the direction in which a finger or the like of the operator comes into contact with the screen, for example, the direction in which the operator presses the screen of touch screen 2 perpendicularly to the screen, is the same direction as the Z direction which is the vibration direction of movable body 40 in electromagnetic actuator 10.

According to vibration presenting apparatus 200 in which control device 1, touch screen 2, and electromagnetic actuator 10 are mounted, touch screen 2 can be directly vibrated since touch screen 2 is directly operated, that is, touch screen 2 is driven together with movable body 40 in the same direction as the touch direction of a finger.

Accordingly, when the operator comes into contact with and operates an image of a mechanical switch or the like displayed on touch screen 2, movable body 40 can be moved to give vibration serving as an operation feeling corresponding to the image, for example, a touch operation feeling that is the same as an operation feeling when an actual mechanical switch is operated. Thus, it is possible to express a comfortable operation.

<Entire Configuration of Electromagnetic Actuator 10>

Figure 2:
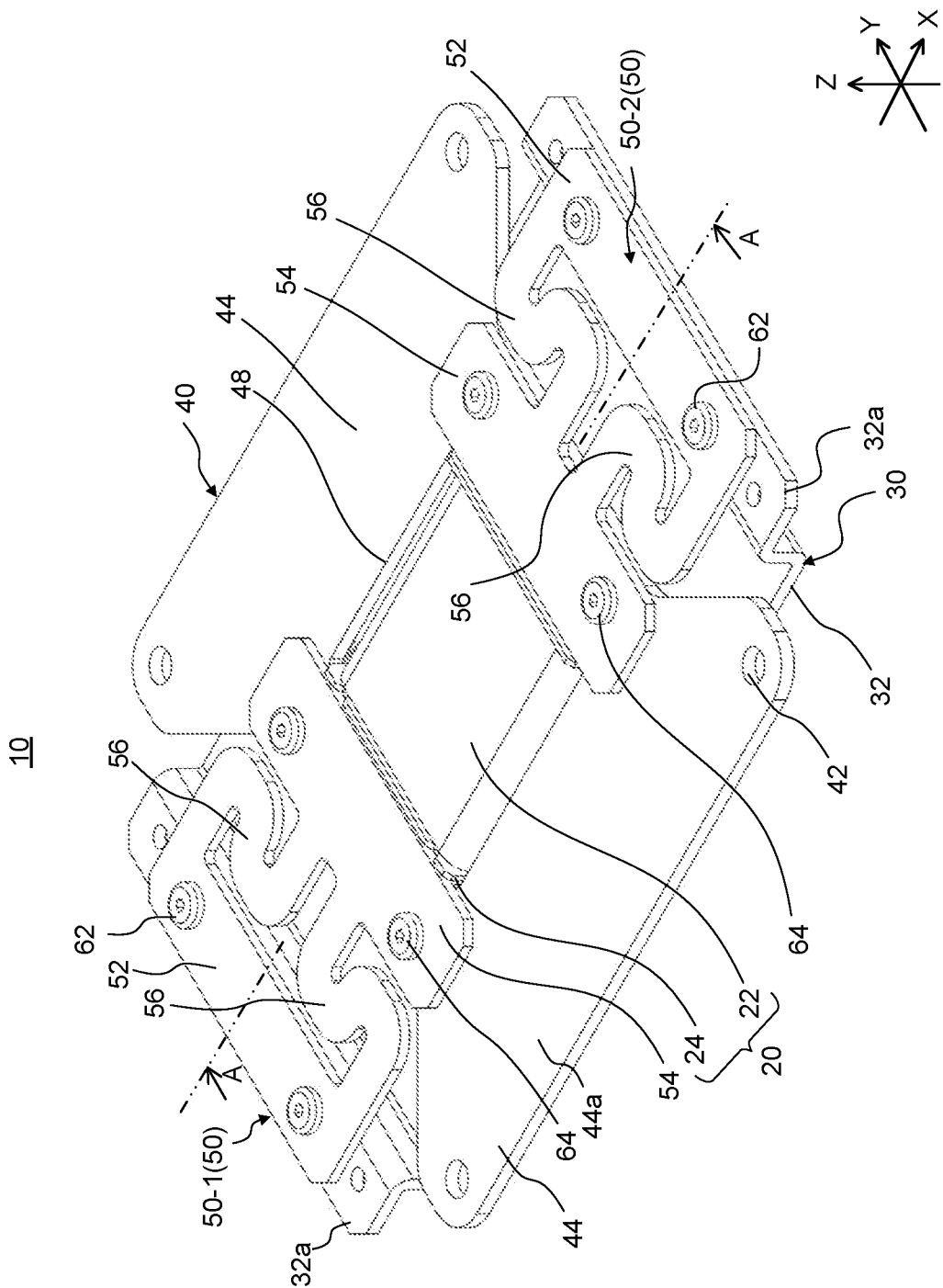
FIG. 2 is a surface-side external perspective view of an electromagnetic actuator as an example that is driven and controlled by the control device according to the embodiment of the present invention.
Figure 3:
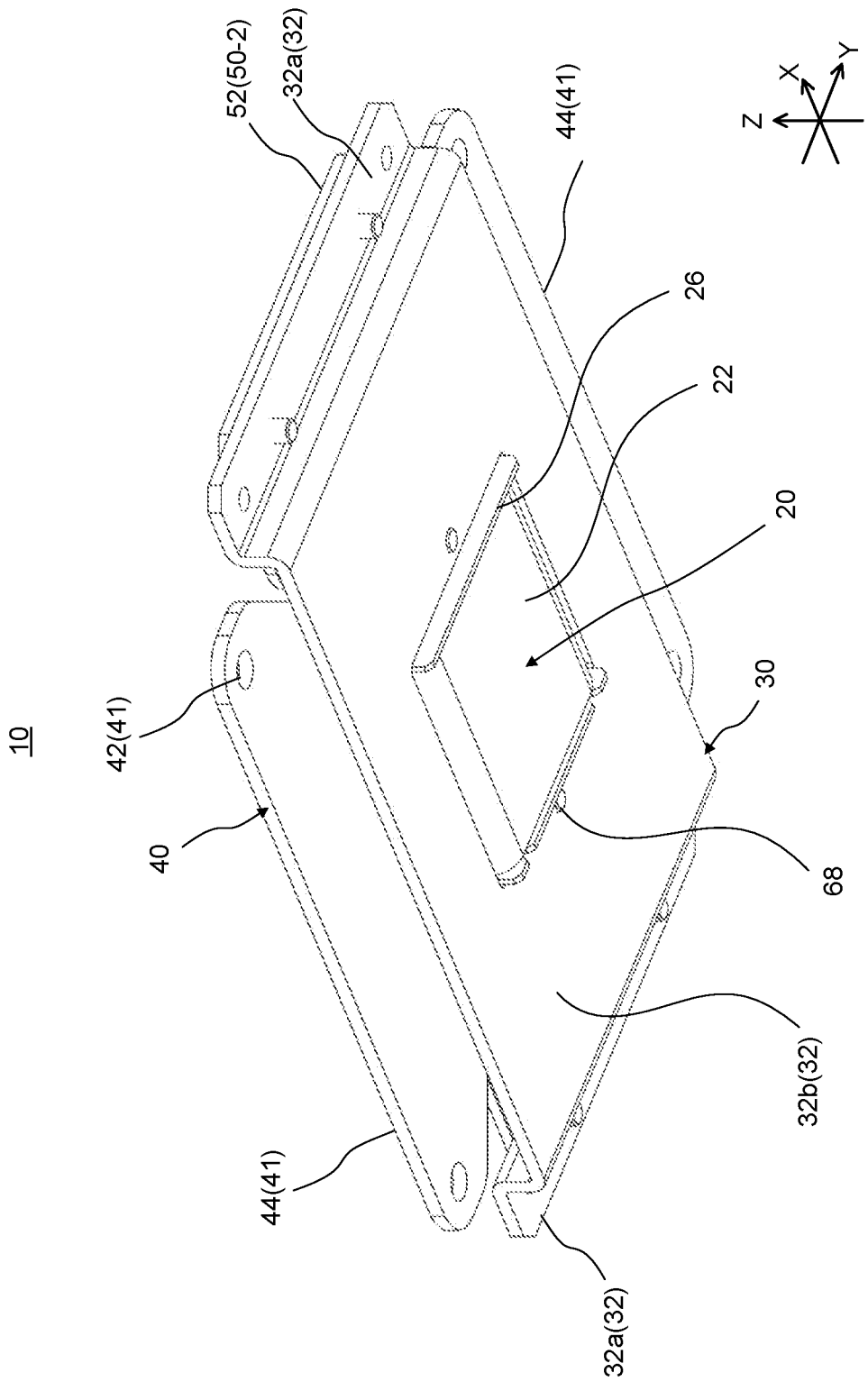
FIG. 3 is a rear-side external perspective view of the same electromagnetic actuator.
Figure 4:
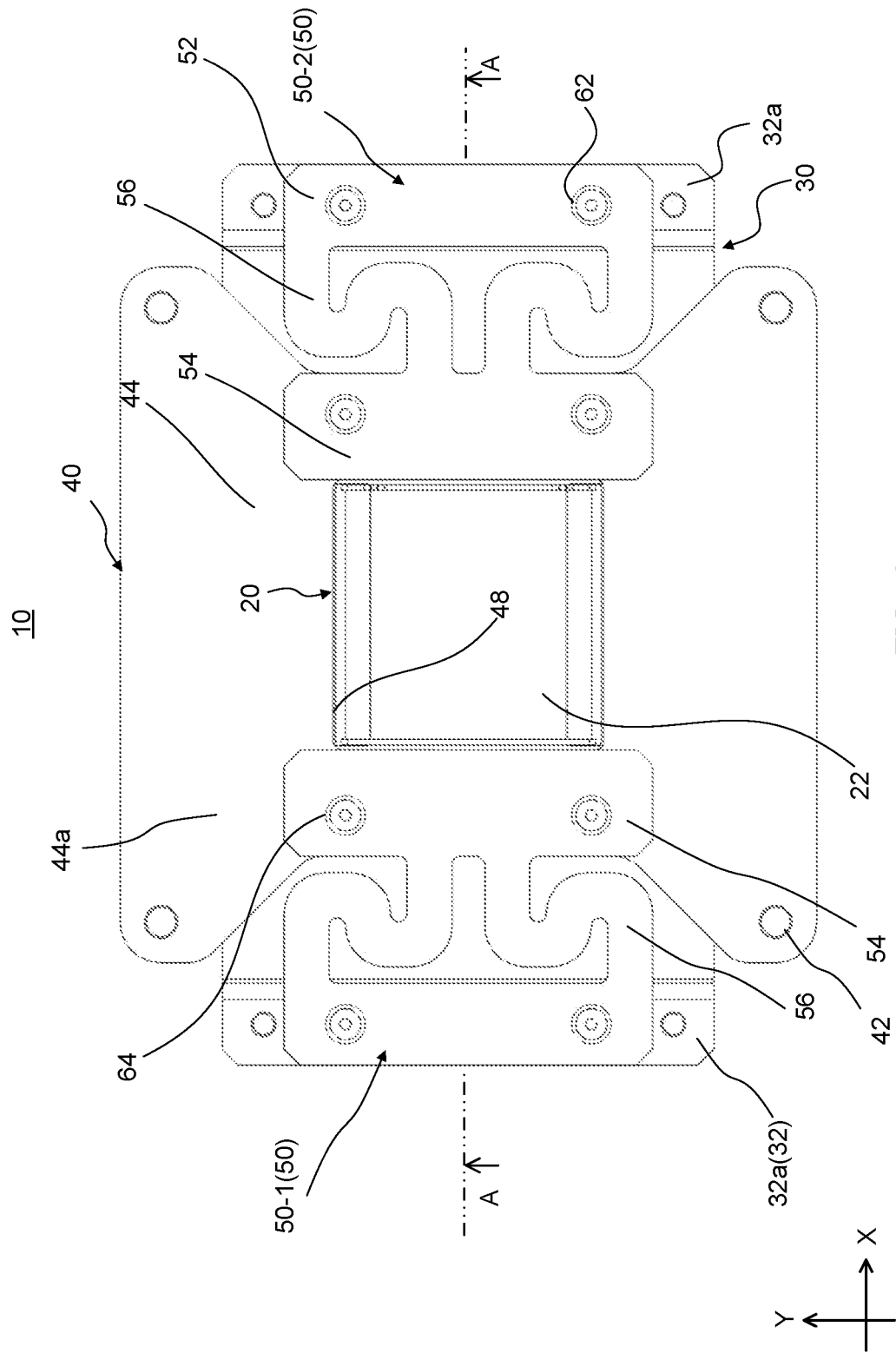
FIG. 4 is a plan view of the same electromagnetic actuator.
Figure 5:
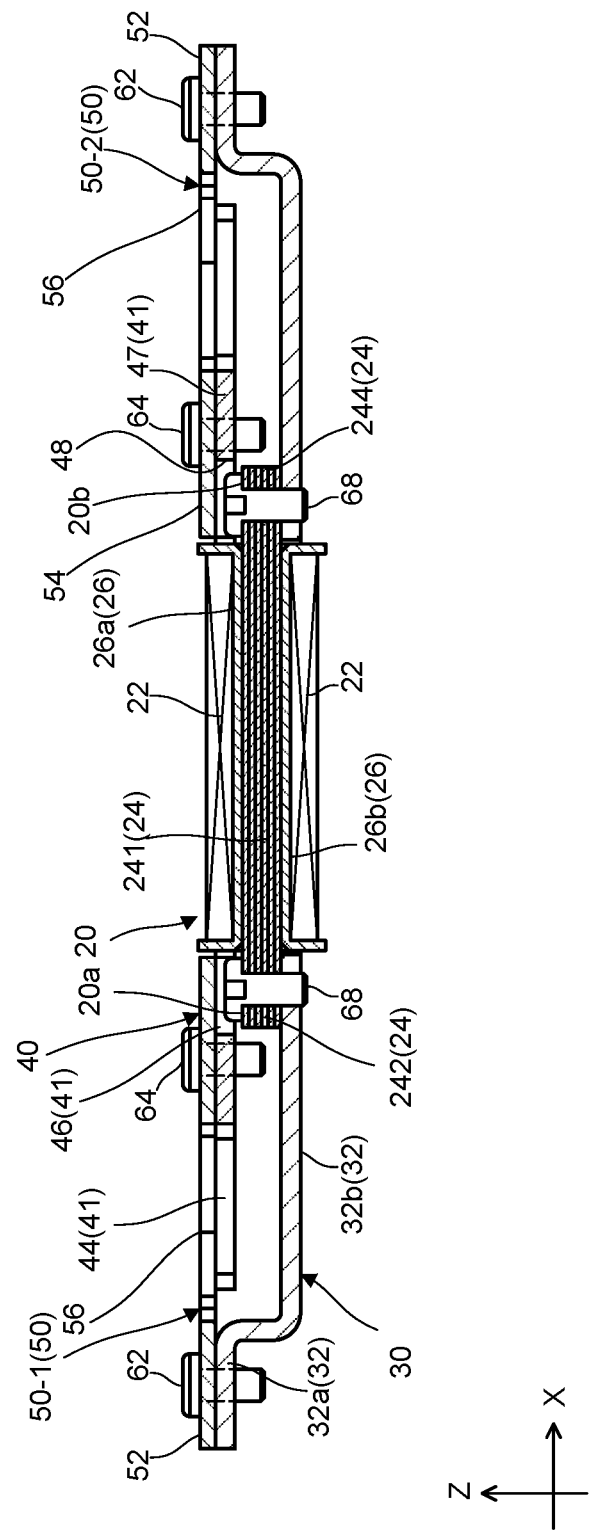
FIG. 5 is a cross-sectional view taken along line A-A of FIG. 4.
Figure 6:
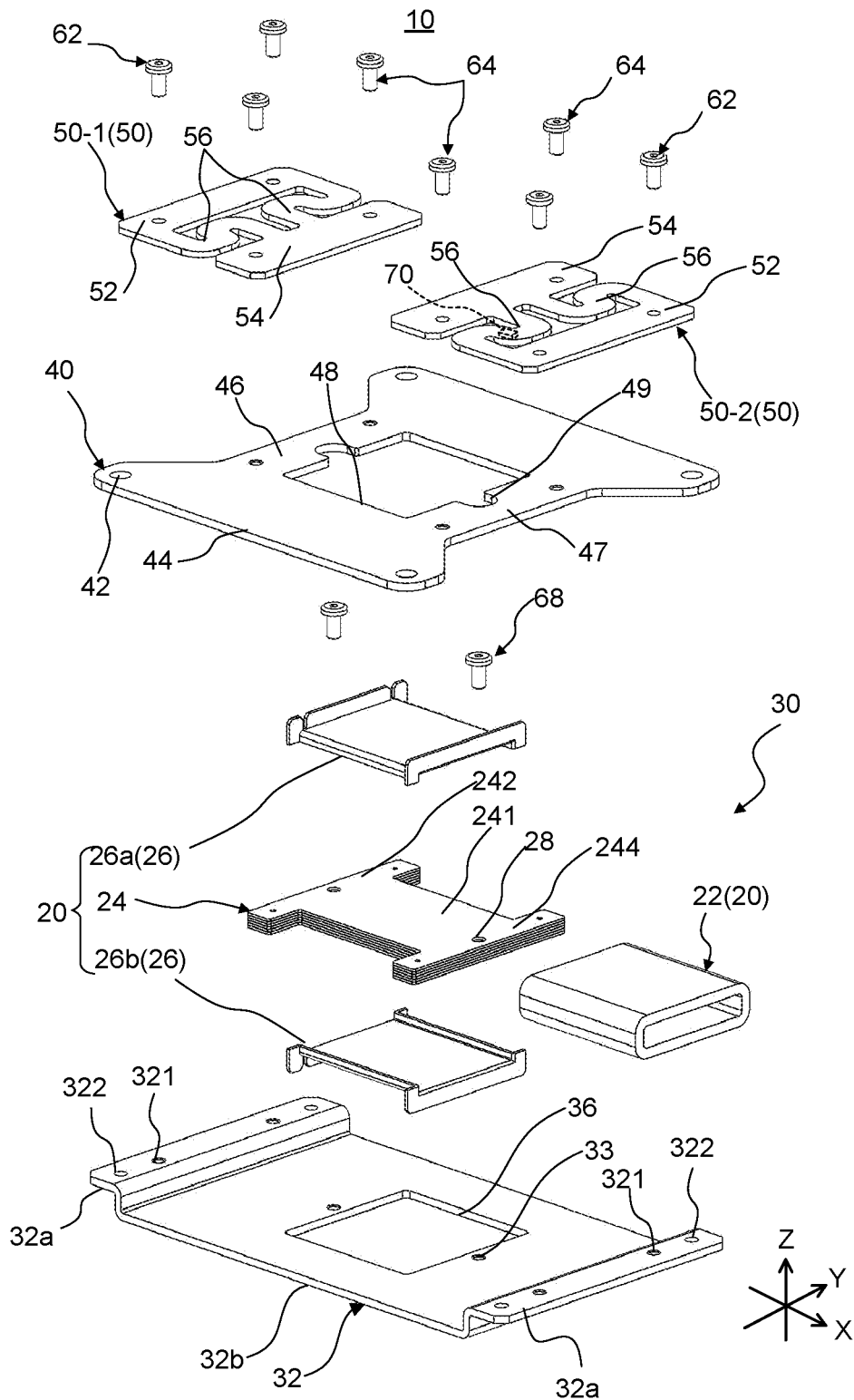
FIG. 6 is an exploded perspective view of the same electromagnetic actuator.
Figure 7:
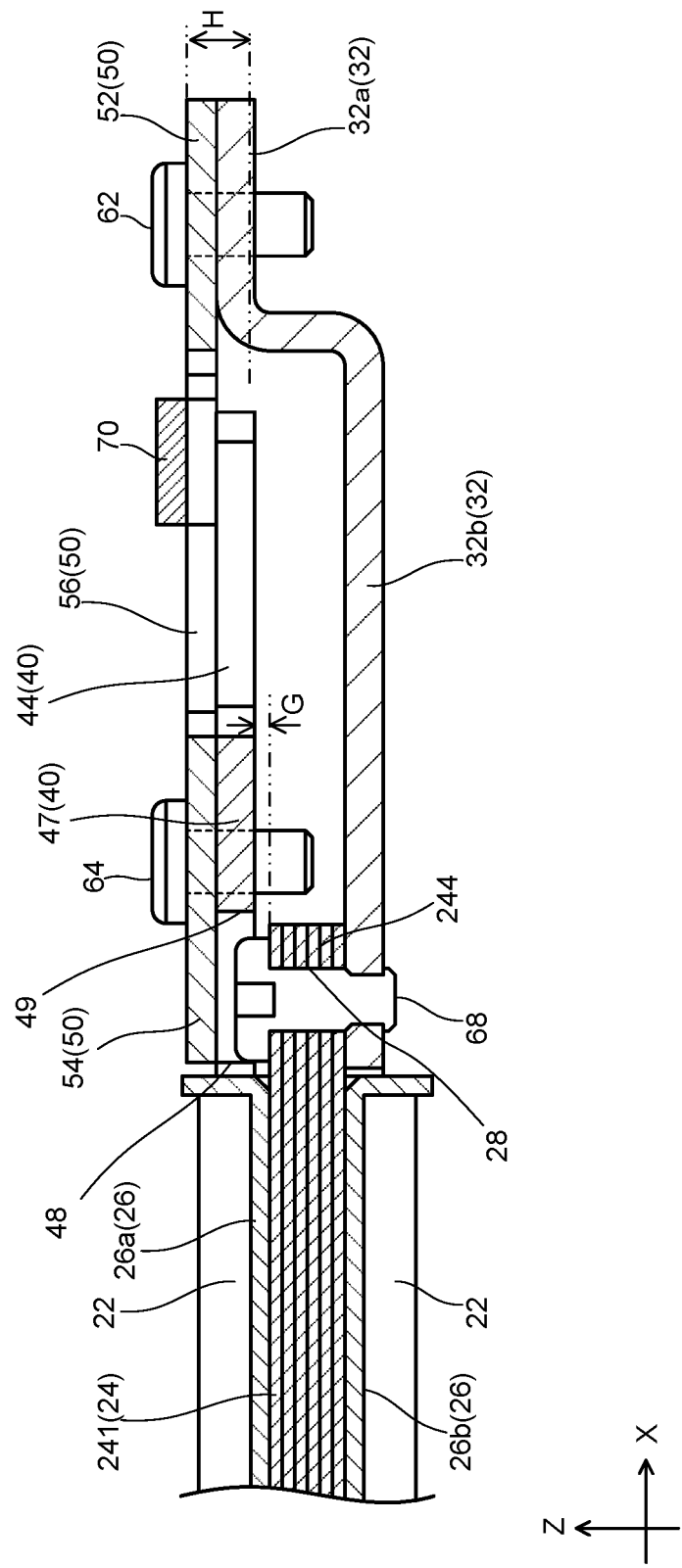
FIG. 7 is a cross-sectional view illustrating a state in which the same electromagnetic actuator is provided with a sensor.

FIG. 2 is a surface-side external perspective view of electromagnetic actuator 10 as an example that is driven and controlled by control device 1 according to the embodiment of the present invention, FIG. 3 is a rear-side external perspective view of electromagnetic actuator 10, and FIG. 4 is a plan view of electromagnetic actuator 10. Further, FIG. 5 is a cross-sectional view taken along line A-A of FIG. 4 and FIG. 6 is an exploded perspective view of electromagnetic actuator 10 of control device 1 according to the embodiment of the present invention. Further, FIG. 7 is a cross-sectional view illustrating a state in which electromagnetic actuator 10 is provided with a sensor.

In the present embodiment, electromagnetic actuator 10 illustrated in FIGS. 2 to 7 is mounted in an electronic device to which control device 1 is applied, and functions as a vibration generating source of touch screen 2 (see FIG. 1) which is an example of the operation device.

Electromagnetic actuator 10 whose details will be described later includes: an electromagnet including coil 22; and movable body 40 including a yoke formed of a magnetic material. Electromagnetic actuator 10 drives movable body 40 in one direction by using coil 22 and moves movable body 40 in the direction opposite to the one direction with an urging force of a member (plate-shaped elastic part 50) that generates the urging force, thereby causing movable body 40 to linearly reciprocate (vibrate). Thus, electromagnetic actuator 10 functions as a vibration actuator.

In response to a touch operation of the operator on screen 2a of touch screen 2, vibration is transmitted to the operator to cause the operator to feel the vibration as a body feeling, and thus, the operator who comes into contact with touch screen 2 can perform an intuitive operation. Note that, touch screen 2 includes a touch position output part that receives a touch operation of the operator on touch screen 2 and outputs the touch position thereof. Control device 1 generates an actuator driving signal (hereinafter referred to as "driving signal") based on touch position information outputted by the touch position output part and a drive timing such that vibration corresponding to the touch operation occurs. Control device 1 then causes the generated driving signal to be applied to a circuit including coil 22 of electromagnetic actuator 10 and causes a driving current to be supplied to coil 22.

Electromagnetic actuator 10 in which the driving current is supplied to coil 22 generates a vibration corresponding to the touch position outputted from touch screen 2 and transmits the vibration to touch screen 2 to vibrate touch screen 2 directly. Thus, electromagnetic actuator 10 receives an operation of the operator received through touch screen 2 and is driven correspondingly thereto.

The driving signal is supplied to coil 22, and thus, electromagnetic actuator 10 moves movable body 40 in one direction (for example, to the minus side in the Z direction) against an urging force. Further, the supply of the driving signal to coil 22 is stopped, and thus, electromagnetic actuator 10 releases an urging force and moves movable body 40 to a side of the other direction (the plus side in the Z direction) with the urging force. Electromagnetic actuator 10 vibrates movable body 40 and the operation device by supplying the driving signal to coil 22 and stopping the supply. Electromagnetic actuator 10 vibrates the operation device by driving movable body 40 without using a magnet.

Further, in the present embodiment, the driving signal is a voltage signal that is outputted from driving signal generating part 130 to driving part 140 and is applied to the circuit including coil 22, as will be described with FIG. 10 to be described later. When a driving signal is applied to driving part 140 which is the circuit including coil 22, a driving current is generated by driving part 140 and is supplied to coil 22.

Figure 11:
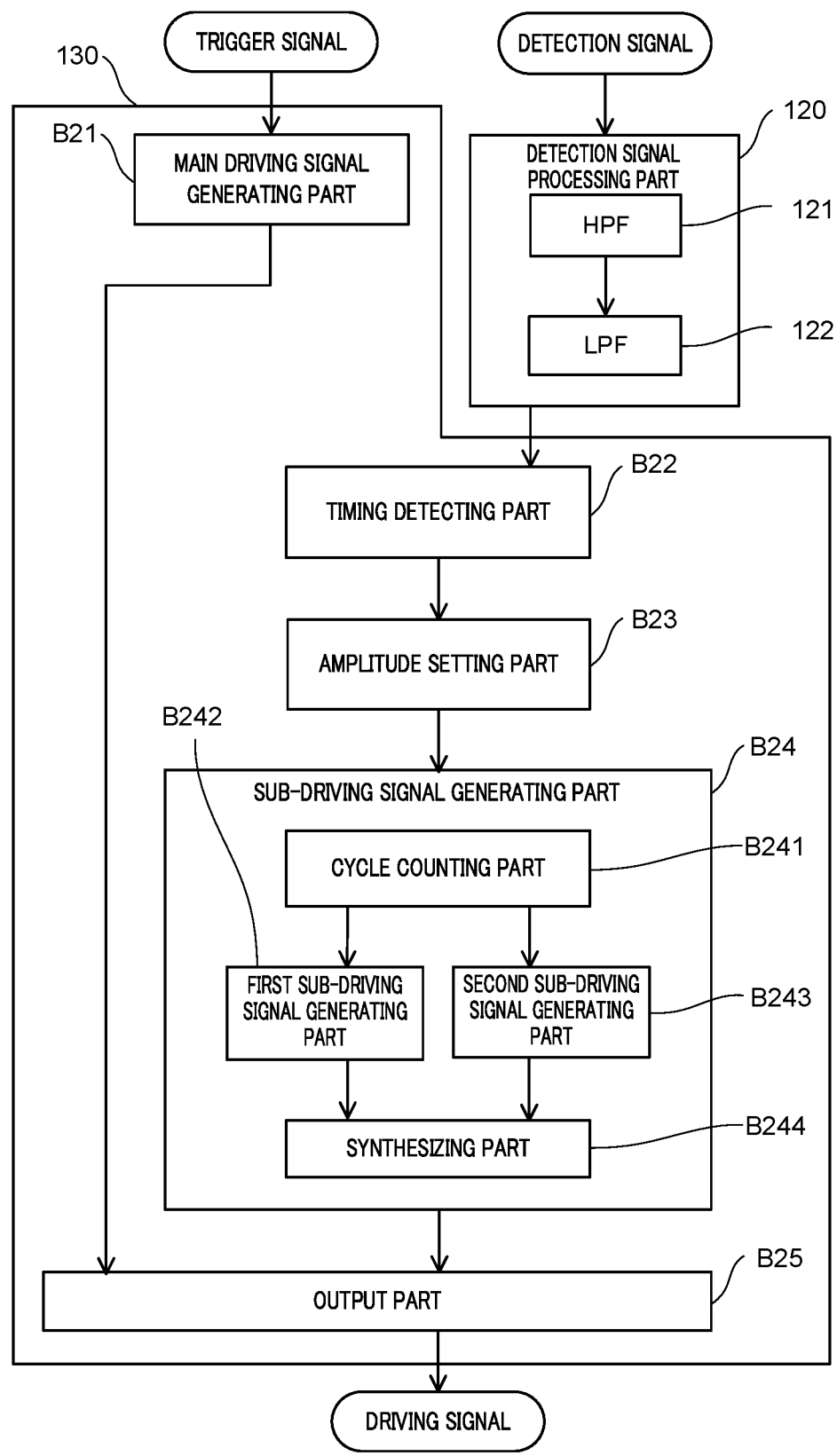
FIG. 11 is a diagram provided for describing the generation of a driving signal in the control device illustrated in FIG. 10.

Further, in the present embodiment, driving signals are formed of main driving and sub-driving signals and driving currents that correspond to main driving and sub-driving signals, respectively, are supplied to coil 22 as driving currents for driving movable body 40, as will be described with FIG. 11 to be described later. Then, when a main driving current corresponding to a main driving signal is supplied to coil 22, movable body 40 moves in one direction and main vibration starts. Thereafter, when a sub-driving current corresponding to a sub-driving signal is supplied to coil 22, a vibration attenuation period is adjusted according to the supply timing of the sub-driving signal, and thus, the period is extended or shortened.

The configuration of electromagnetic actuator 10 will be described. Electromagnetic actuator 10 includes: core assembly 20 including coil 22 and core 24; fixing body 30 including base part 32; movable body 40 including yoke 41; plate-shaped elastic part (elastic support part) 50 (50-1 and 50-2); and the like. Plate-shaped elastic part 50 elastically supports movable body 40 such that movable body 40 is movable in the vibration direction thereof with respect to fixing body 30.

Electromagnetic actuator 10 drives movable body 40, which is movably supported by plate-shaped elastic part 50, such that movable body 40 moves in one direction with respect to fixing body 30. With respect to movable body 40 moved in the one direction, the movement of movable body 40 in the direction opposite to the one direction is performed with an urging force of plate-shaped elastic part 50.

Specifically, electromagnetic actuator 10 vibrates yoke 41 of movable body 40 with core assembly 20. Specifically, movable body 40 is vibrated with an attraction force of coil 22 to be energized and core 24 excited by coil 22 to be energized and with the urging force of plate-shaped elastic part 50 (50-1 and 50-2).

Electromagnetic actuator 10 is formed in a flat shape with the Z direction as the thickness direction. Electromagnetic actuator 10 vibrates movable body 40 in the Z direction, that is, the thickness direction as the vibration direction with respect to fixing body to cause one surface of the front and rear surfaces of electromagnetic actuator 10, which are disposed away from each other in the thickness direction, to approach or be separated from the other surface in the Z direction.

In the present embodiment, electromagnetic actuator 10 moves movable body 40 to the minus side in the Z direction as the one direction with the attraction force of core 24, and moves movable body 40 to the plus side in the Z direction as the direction opposite to the one direction with the urging force of plate-shaped elastic part 50 (50-1 and 50-2).

In electromagnetic actuator 10 of the present embodiment, movable body 40 is elastically supported by a plurality of plate-shaped elastic parts 50 (50-1 and 50-2) that is disposed along the direction orthogonal to the Z direction, in positions of point symmetry with respect to a movable center of movable body 40. However, the configuration is not limited thereto.

Plate-shaped elastic part 50 is configured to be fixed between movable body 40 and fixing body 30 and to elastically support movable body 40 with respect to fixing body 30 such that movable body 40 is movable with respect to fixing body 30 at least in a direction facing one end part of both end parts (magnetic pole parts 242 and 244; see FIG. 5) of core 24. As long as plate-shaped elastic part 50 has such a configuration, plate-shaped elastic part 50 may be provided in any way.

For example, plate-shaped elastic part 50 may elastically support movable body 40 with respect to fixing body 30 (core assembly 20) such that movable body 40 is movable in a direction facing one end part (magnetic pole part 242 or 244) of core 24. Further, plate-shaped elastic parts 50-1 and 50-2 may be disposed line symmetrically with respect to a center of movable body 40, and two or more plate-shaped elastic parts 50 may also be used. Each of plate-shaped elastic parts 50-1 and 50-2 is fixed to fixing body 30 on a side of one end thereof, is fixed to movable body 40 on a side of the other end thereof, and supports movable body 40 such that movable body 40 is movable with respect to fixing body 30 in the vibration direction (the Z direction, and here the up-and-down direction).

<Fixing Body 30>

As illustrated in FIGS. 5 to 9, fixing body 30 includes: core assembly 20 including coil 22 and core 24; and base part 32.

<Base Part 32>

Core assembly 20 is fixed to base part 32, and base part 32 supports movable body such that movable body 40 is movable in the vibration direction via plate-shaped elastic part 50 (50-1 and 50-2). Base part 32 is a member in a flat shape, and forms the bottom surface of electromagnetic actuator 10. Base part 32 includes attachment parts 32a to which one end parts of plate-shaped elastic part 50 (plate-shaped elastic parts 50-1 and 50-2) are fixed, such that attachment parts 32a hold core assembly 20 therebetween. Attachment parts 32a are disposed with the same distance from core assembly 20. Note that, this distance serves as a deformation region of plate-shaped elastic part 50 (50-1 and 50-2).

Attachment part 32a includes fixing holes 321 for fixing plate-shaped elastic part 50 (50-1 and 50-2); and fixing holes 322 for fixing base part 32 to base 3 (see FIG. 1). Fixing holes 322 are provided in both end parts of attachment part 32a so as to hold fixing holes 321 therebetween. Thus, base part 32 is entirely and stably fixed to base 3 (see FIG. 1).

In the present embodiment, base part 32 is configured such that a sheet metal is processed and one side part and the other side part as attachment parts 32a hold bottom surface part 32b therebetween and are located separated from each other in the depth direction. A recessed part including bottom surface part 32b lower in height than attachment parts 32a is provided between attachment parts 32a. The space inside the recessed part, that is, on a side of the front surface of bottom surface part 32b serves for ensuring an elastic deformation region of plate-shaped elastic part 50 (50-1 and 50-2) and for ensuring a movable region of movable body 40 supported by plate-shaped elastic part 50 (50-1 and 50-2).

Bottom surface part 32b has a rectangular shape, opening part 36 is formed in a center portion thereof, and core assembly 20 is disposed inside opening part 36.

Opening part 36 has a shape corresponding to the shape of core assembly 20. In the present embodiment, opening part 36 is formed in a square shape. Thus, electromagnetic actuator 10 in its entirety can have a substantially square shape in a front view by disposing core assembly 20 and movable body 40 in a center portion of electromagnetic actuator 10. Note that, opening part 36 may have a rectangular shape (including a square shape).

Divided body 26b of bobbin 26 on a lower side of core assembly 20 and a lower-side portion of coil 22 are inserted into opening part 36, and are fixed such that core 24 is located on bottom surface part 32b in a side view. Thus, the length (thickness) in the Z direction is thinner in comparison with a configuration in which core assembly 20 is attached onto bottom surface part 32b. Further, since core assembly 20 is fixed in a state in which a portion thereof, here, a portion on a side of the bottom surface thereof is fitted into opening part 36, core assembly 20 is firmly fixed to bottom surface part 32b in a state in which core assembly 20 is not easily detached from bottom surface part 32b.

<Core Assembly 20>

Core assembly 20 is formed by winding coil 22 around the outer periphery of core 24 via bobbin 26.

When coil 22 is energized, core assembly 20 vibrates yoke 41 of movable body 40 (causes yoke 41 of movable body 40 to linearly reciprocate in the Z direction) in cooperation with plate-shaped elastic part 50 (50-1 and 50-2).

In the present embodiment, core assembly 20 is formed in a rectangular plate shape. Magnetic pole parts 242 and 244 are disposed in both side portions of core assembly 20, where the both side parts are separated from each other in the longitudinal direction (the X direction) of the rectangular plate shape.

These magnetic pole parts 242 and 244 are disposed so as to be capable of facing attracted surface parts 46 and 47 of movable body 40 with a gap therebetween in the X direction. In the present embodiment, counter surfaces (counter surface parts) 20a and 20b as the upper surfaces are diagonally adjacent to the lower surfaces of attracted surface parts 46 and 47 of yoke 41 in the vibration direction (the Z direction) of movable body 40.

As illustrated in FIG. 2, core assembly 20 is fixed to base part 32 with a winding axis of coil 22 directed in the direction in which attachment parts 32a separated from each other in base part 32 face each other (the X direction orthogonal to the vibration direction). In the present embodiment, core assembly 20 is disposed in a center portion of base part 32, specifically in a center portion of bottom surface part 32b. As illustrated in FIGS. 3 to 9, core assembly 20 is fixed to bottom surface part 32b such that core 24 is located parallel to bottom surface part 32b and on the bottom surface across opening part 36. Core assembly 20 is fixed in a state in which coil 22 and a portion (core main body 241) around which coil 22 is wound are located within opening part 36 of base part 32.

Specifically, core assembly 20 is fixed to bottom surface part 32b by fastening screws 68 through fixing holes 28 and fastening holes 33 (see FIG. 6) of bottom surface part 32b in a state in which coil 22 is disposed within opening part 36. Core assembly 20 and bottom surface part 32b are joined in two positions on the axial center of coil 22 with screws 68 as fastening members so as to hold coil 22 among both side parts of opening part 36, which are separated from each other in the Y direction, and magnetic pole parts 242 and 244.

Coil 22 is a solenoid that is energized and generates a magnetic field when electromagnetic actuator 10 is driven.

Coil 22, core 24, and movable body 40 form a magnetic circuit (magnetic path) that attracts and moves movable body 40. Although details thereof will be described with reference to FIG. 10, electromagnetic actuator 10 is driven when a driving signal generated in control device 1 is applied to the circuit including coil 22 and a driving current is supplied to coil 22.

Core 24 includes core main body 241 around which coil 22 is wound, and magnetic pole parts 242 and 244 provided in both end parts of core main body 241 and excited by energizing coil 22. Core 24 may have any structure as long as the structure has such a length that both end parts of core 24 serve as magnetic pole parts 242 and 244 when coil 22 energized. For example, core 24 of the present embodiment is formed in an H-type flat plate shape in a plan view although core 24 may be formed in a straight-type (I-type) flat plate shape.

In the case of the I-type core, the areas of surfaces (air gap side surfaces) on sides of attracted surface parts 46 and 47 facing both end parts (magnetic pole parts) of the I-type core with air gap G therebetween become narrow. Thus, the magnetic resistance in the magnetic circuit may increase and the conversion efficiency may decrease. Further, when the bobbin is attached to the core, there is no space or a small space for positioning of the bobbins in the longitudinal direction of the core, and thus, it is necessary to provide the space for positioning separately.

In contrast, since core 24 is of the H-type, the air gap side surfaces in the both end parts of core main body 241 can be expanded in the front-rear direction (the Y direction) longer than the width of core main body 241, around which coil 22 is wound, and a decrease in the magnetic resistance and improvement in the efficiency of the magnetic circuit can be achieved. Further, coil 22 can be positioned by simply fitting bobbin 26 between portions of magnetic pole parts 242 and 244, where the portions projected from core main body 241, and it is unnecessary to separately provide a positioning member for bobbin 26 with respect to core 24.

In core 24, in the respective both end parts of core main body 241 having a plate shape, around which coil 22 is wound, magnetic pole parts 242 and 244 are provided to protrude in the direction orthogonal to the winding axis of coil 22.

Core 24 is a magnetic material made of a soft magnetic material or the like, and is formed of, for example, a silicon steel sheet, permalloy, ferrite, or the like. Further, core 24 may also be formed of electromagnetic stainless steel, a sintered material, a metal injection mold (MIM) material, a laminated steel sheet, an electrogalvanized steel sheet (SECC), or the like.

Magnetic pole parts 242 and 244 are excited by energizing coil 22, attract and move yoke 41 of movable body 40, which is separated from magnetic pole parts 242 and 244 in the vibration direction (the Z direction). Specifically, magnetic pole parts 242 and 244 attract attracted surface parts 46 and 47 of movable body 40, which are disposed to face magnetic pole parts 242 and 244 via gap G, with a magnetic flux that occurs.

In the present embodiment, magnetic pole parts 242 and 244 are plate-shaped bodies extending in the Y direction that is a direction perpendicular to core main body 241 extending in the X direction. Magnetic pole parts 242 and 244 are long in the Y direction, and thus, the areas of counter surfaces 20a and 20b facing yoke 41 are wider than the configurations formed in the both end parts of core main body 241.

Bobbin 26 is disposed so as to surround the periphery of core main body 241 of core 24 in the longitudinal direction.

Bobbin 26 is formed of, for example, a resin material, which makes it possible to ensure electrical insulation with other metallic members (for example, core 24), and thus, the reliability as the electric circuit improves. The formability improves by using a resin having a high fluidity as the resin material, and the thickness of bobbin 26 can be reduced while ensuring the strength of bobbin 26. Note that, bobbin 26 is formed as a cylindrical body covering the periphery of core main body 241, by assembling divided bodies 26a and 26b such that divided bodies 26a and 26b hold core main body 241 therebetween. In bobbin 26, flanges are provided in both end parts of the cylindrical body, and define that coil 22 is located on the outer periphery of core main body 241.

<Movable Body 40>

Movable body 40 is disposed so as to face core assembly 20 with gap G therebetween in the direction orthogonal to the vibration direction (the Z direction). Movable body 40 is provided to be capable of reciprocating in the vibration direction with respect to core assembly 20.

Movable body 40 includes yoke 41, and includes movable-body side fixing parts 54 of plate-shaped elastic parts 50-1 and 50-2 that are fixed to yoke 41.

Movable body 40 is disposed in a state (reference normal state position) of being movable in an approaching/separating direction (the Z direction) and being hanged separated substantially in parallel, with respect to bottom surface part 32b via plate-shaped elastic part 50 (50-1 and 50-2).

Yoke 41 is a magnetic path of a magnetic flux that occurs when coil 22 is energized, and is a plate-shaped body formed of a magnetic material such as electromagnetic stainless steel, a sintered material, a metal injection mold (MIM) material, a laminated steel sheet, and an electrogalvanized steel sheet (SECC). In the present embodiment, yoke 41 is formed by processing an SECC sheet.

Yoke 41 is suspended so as to face core assembly 20 with gap G (see FIG. 7) therebetween in the vibration direction (the Z direction) with plate-shaped elastic part 50 (50-1 and 50-2) to be fixed to each of attracted surface parts 46 and 47 separated from each other in the X direction.

Yoke 41 includes: surface-part fixing part 44 to which the operation device (see touch screen 2 illustrated in FIG. 1) is attached; and attracted surface parts 46 and 47 to be disposed to face magnetic pole parts 242 and 244.

Yoke 41 is formed in a rectangular frame shape including opening part 48 in a center portion thereof, and includes: surface-part fixing part 44; and attracted surface parts 46 and 47 that surround opening part 48.

Opening part 48 faces coil 22. In the present embodiment, opening part 48 is located right above coil 22, and the opening shape of opening part 48 is formed in a shape that allows the portion of coil 22 in core assembly 20 to be inserted thereto when yoke 41 moves to a side of bottom surface part 32b.

Yoke 41 is configured to include opening part 48, and thus, the thickness of the entire electromagnetic actuator can be reduced in comparison with a case where there is no opening part 48.

Further, core assembly 20 is located within opening part 48, and thus, yoke 41 is not disposed near coil 22, a decrease in the conversion efficiency due to magnetic flux leakage leaked from coil 22 can be suppressed, and a high output can be achieved.

Surface-part fixing part 44 includes fixing surface 44a that comes in surface contact with touch screen 2 as an example of the operation device and fixes touch screen 2. Fixing surface 44a has a trapezoidal shape in a plan view, and comes in surface contact with touch screen 2 that is fixed to surface-part fixing part 44 via fastening members such as screws to be inserted into surface-part fixing holes 42.

Movable-body side fixing parts 54 of plate-shaped elastic parts 50-1 and 50-2 are fixed in a stacked state to attracted surface parts 46 and 47, respectively. Attracted surface parts 46 and 47 are provided with notches 49 from which the head parts of screws 64 of core assembly 20 escape when movable body 40 moves to a side of bottom surface part 32b.

Thus, even when movable body 40 moves to the side of bottom surface part 32b and attracted surface parts 46 and 47 approach magnetic pole parts 242 and 244, attracted surface parts 46 and 47 do not come into contact with screws 68 that fix magnetic pole parts 242 and 244 to bottom surface part 32b, and a movable region of yoke 41 for that in the Z direction can be ensured.

<Plate-Shaped Elastic Part 50 (50-1 and 50-2)>

Plate-shaped elastic part 50 (50-1 and 50-2) movably supports movable body 40 with respect to fixing body 30. Plate-shaped elastic part 50 (50-1 and 50-2) supports the upper surface of movable body 40 so as to be parallel to each other at the same height as the upper surface of core assembly 20, or a lower surface side of the upper surface of fixing body 30 (the upper surface of core assembly 20 in the present embodiment). Note that, plate-shaped elastic parts 50-1 and 50-2 have a symmetrical shape with respect to the center of movable body 40 and, in the present embodiment, are members formed in the same manner.

Plate-shaped elastic part 50 causes yoke 41 to be disposed substantially in parallel to magnetic pole parts 242 and 244 of core 24 of core assembly 20 such that yoke 41 faces magnetic pole parts 242 and 244 in the vibration direction (the Z direction) with gap G therebetween. Plate-shaped elastic part 50 movably supports the lower surface of movable body 40 in the vibration direction in a position on a side of bottom surface part 32b rather than a level substantially the same as the height level of the upper surface of core assembly 20.

Plate-shaped elastic part 50 is a plate spring, and includes: fixing-body side fixing parts 52; movable-body side fixing parts 54; and elastic arm parts 56 having a meander shape, each of which communicates fixing-body side fixing part 52 with movable-body side fixing part 54.

Plate-shaped elastic part 50 attaches movable body 40 by attaching fixing-body side fixing parts 52 to the front surfaces of attachment parts 32a, attaching movable-body side fixing parts 54 to the front surfaces of attracted surface parts 46 and 47 of yoke 41, and causing elastic arm parts 56 to be parallel to bottom surface part 32b.

Fixing-body side fixing parts 52 are joined and fixed to attachment parts 32a in surface contact with each other by screws 62. Movable-body side fixing parts 54 are joined and fixed to attracted surface parts 46 and 47 in surface contact with each other by screws 64.

Elastic arm part 56 is an arm part including a meander-shaped part which is elastically deformed. In the present embodiment, elastic arm part 56 has a shape that extends in directions facing fixing-body side fixing part 52 and movable-body side fixing part 54 and is folded back. In elastic arm part 56, end parts to be joined to fixing-body side fixing part 52 and movable-body side fixing part 54, respectively, are formed in positions shifted in the Y direction. Elastic arm parts 56 are disposed in positions of point symmetry or line symmetry with respect to the center of movable body 40.

Thus, movable body 40 is supported on the both sides thereof by elastic arm parts 56 including meander-shaped springs, and thus, stress dispersion at the time of elastic deformation is possible. That is, plate-shaped elastic part 50 is capable of moving movable body 40 in the vibration direction (the Z direction) without movable body 40 tilting with respect to core assembly 20, and is capable of achieving an improvement in the reliability of the vibration state.

Each plate-shaped elastic part 50 includes at least two or more elastic arm parts 56. Thus, in comparison with a case where each plate-shaped elastic part 50 includes one elastic arm part, plate-shaped elastic part 50 enables a stress at the time of elastic deformation to be dispersed to achieve an improvement in the reliability, and enables the balance of the support with respect to movable body 40 to be improved to achieve an improvement in the stability.

In the present embodiment, plate-shaped elastic part 50 is formed of a magnetic material. Further, movable-body side fixing parts 54 of plate-shaped elastic part 50 are disposed in positions in which movable-body side fixing parts 54 face the both end parts (magnetic pole parts 242 and 244) of the core in a coil winding axis direction or are disposed on the upper sides of the both end parts of the core to become a magnetic path.

In the present embodiment, movable-body side fixing parts 54 are fixed in a stacked state on the upper sides of attracted surface parts 46 and 47. Thus, thickness (the length in the Z direction and the vibration direction) H (see FIG. 7) of attracted surface parts 46 and 47 facing magnetic pole parts 242 and 244 of the core assembly can be increased as the thickness of the magnetic material. Since the thickness of plate-shaped elastic part 50 and the thickness of yoke 41 are the same, the cross-sectional areas of portions of the magnetic material where the portions face magnetic pole parts 242 and 244 can be doubled. Thus, in comparison with a case where the plate spring is non-magnetic, it is possible to ease a decrease in characteristics due to magnetic saturation in the magnetic circuit by expanding the magnetic path of the magnetic circuit to achieve an output improvement.

Note that, electromagnetic actuator 10 of the present embodiment may be provided with a detection part that detects a push-in amount or a push-in-related amount of movable body 40 when the operation device to be fixed to surface-part fixing part 44 is operated. In the present embodiment, for example, as illustrated in FIGS. 6 and 7, strain detection sensor 70 that detects strain of plate-shaped elastic part 50 may be provided as a detection part for a push-in-related amount.

Strain detection sensor 70 detects strain of plate-shaped elastic part 50 is deformed when surface-part fixing part 44 is pushed in to a side of bottom surface part 32b. The detected strain is outputted as a detection signal to control device 1. As described with FIG. 11 to be described later, control device 1 generates a driving signal (sub-driving signal) based on a detection signal and to be applied to the circuit including coil 22. Thus, coil 22 is energized and attracts yoke 41 to move (vibrate) movable body 40.

As described above, strain detection sensor 70 may be used and control device 1 may adjust the vibration cycle of movable body 40 (operation device) based on a touch operation of the operator, that is, a detection result of the sensor that detects a push-in-related amount of movable body 40. Further, apart from strain detection sensor 70, an operation signal for generating, in conjunction with a display form of a touch position of the operator detected by the operation device, vibration corresponding to the display form may be outputted to control device 1, and control device 1 may control the vibration cycle of movable body 40 correspondingly.

In the present embodiment, when control device 1 can detect that the operator comes into contact with the operation device, control device 1 can realize vibration feedback for the touch even without determining a displacement amount (for example, a push-in amount) of the operation device to be operated. In addition, when control device 1 can determine an actual displacement amount of the operation device, for example, when control device 1 can detect, as an amount corresponding to the displacement amount, a push-in amount with respect to plate-shaped elastic part 50, control device 1 can realize expression of a more natural feeling by using a result of the above detection.

Here, strain detection sensor 70 is attached near to the root, which has large strain, of elastic arm part 56 of plate-shaped elastic part 50, and is disposed in a region, so-called a dead space, that does not interfere with any other member.

Note that, strain detection sensor 70 is not necessarily attached to one position, but may be attached to a plurality of positions. In this case, strain detection sensors 70 are preferably disposed in at least three or more positions so as to radially surround the center of the operation surface of the operation device at equal distances. For example, when an example will be described with reference to FIG. 6, strain detection sensors 70 are disposed in each elastic arm part 56 of plate-shaped elastic parts 50-1 and 50-2, in a total of four positions. Thus, electromagnetic actuator 10 receives displacement of the operation device with a surface when the operation device is operated, and strain detection sensors 70 can accurately detect strain of plate-shaped elastic part 50 due to the displacement.

Further, here, electromagnetic actuator 10 has a configuration of a yoke vibration type in which core assembly 20 fixed to a side of fixing body 30 vibrates movable body 40 (yoke 41) supported by fixing body 30 via plate-shaped elastic part 50. Alternatively, electromagnetic actuator 10 may be an electromagnetic actuator of a core vibration configuration in which a movable body supported by a fixing body via a plate-shaped elastic part includes a core assembly and the movable body itself vibrates with respect to the fixing body. In the case of such a configuration, a strain detection sensor that detects a push-in-related amount (strain) when the operation device is operated may be attached to the plate-shaped elastic part or may be attached to a movable body-side member (for example, a frame or the like that connects the operation device and the movable body).

Further, instead of strain detection sensor 70, a detection part for push-in amount detection, such as an electrostatic capacitance sensor, that measures the distance between bottom surface part 32b, which faces a deformation portion of plate-shaped elastic part 50, and plate-shaped elastic part 50, which is pushed in and displaced, may be disposed on bottom surface part 32b below plate-shaped elastic part 50.

Figure 8:
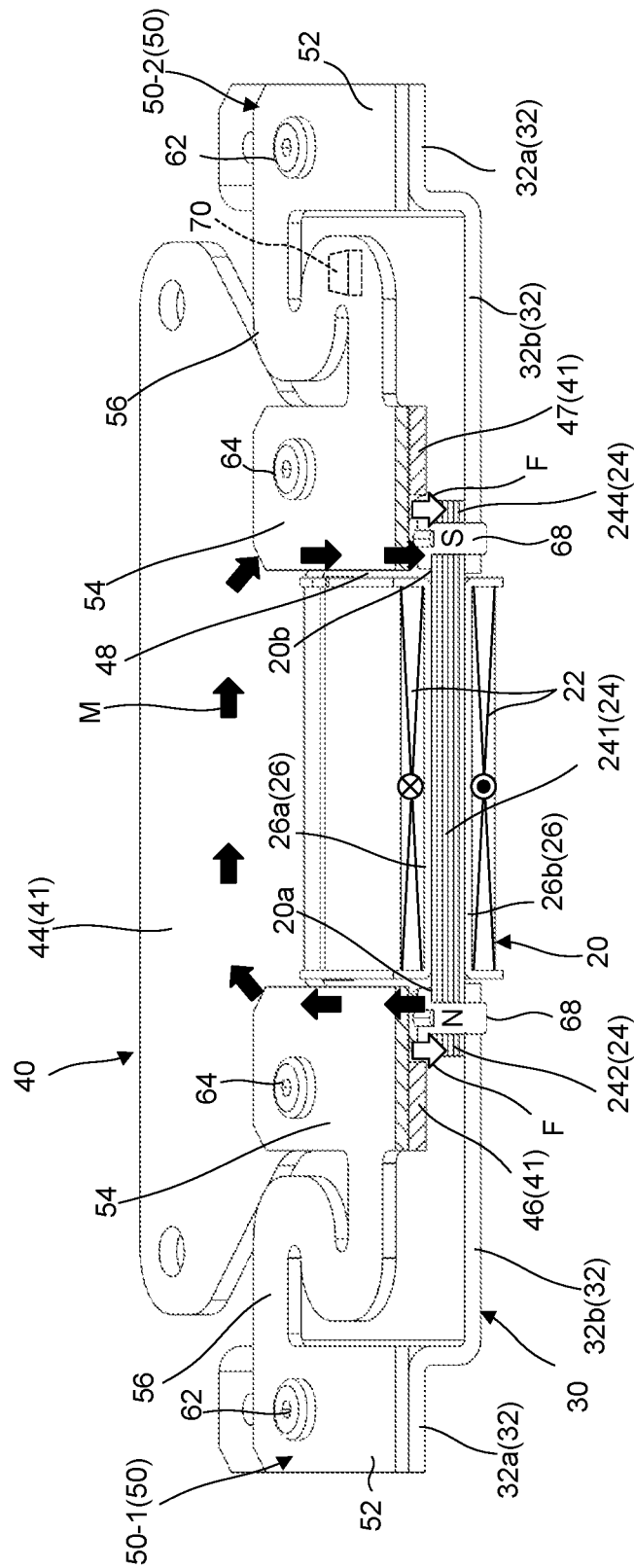
FIG. 8 illustrates a magnetic circuit configuration of the same electromagnetic actuator.

FIG. 8 illustrates a magnetic circuit of electromagnetic actuator 10. Note that, FIG. 8 is a perspective view of electromagnetic actuator 10 cut by line A-A of FIG. 4, and the magnetic circuit includes magnetic flux flow M that is the same in a portion in which magnetic flux flow M is not illustrated as well as in a portion in which magnetic flux flow M is illustrated. Further, FIGS. 9A and 9B are cross-sectional views schematically illustrating the movement of the movable body due to the magnetic circuit. Specifically, FIG. 9A illustrates a state in which movable body 40 is held in a position separated from core assembly 20 by plate-shaped elastic part 50, and FIG. 9B illustrates movable body 40 that is attracted and moved to a side of core assembly 20 with a magnetomotive force due to the magnetic circuit.

Specifically, when coil 22 is energized, core 24 is excited to generate a magnetic field, and the both end parts of core 24 become magnetic poles. For example, in FIG. 8, magnetic pole part 242 is the N-pole and magnetic pole part 244 is the S-pole in core 24. Then, a magnetic circuit indicated by magnetic flux flow M is formed between core assembly and yoke 41. Magnetic flux flow M in this magnetic circuit flows from magnetic pole part 242 to attracted surface part 46 of yoke 41, where attracted surface part 46 faces magnetic pole part 242, passes through surface-part fixing part 44 of yoke 41, and reaches magnetic pole part 244, which faces attracted surface part 47, from attracted surface part 47. In the present embodiment, plate-shaped elastic part 50 is also a magnetic material. Thus, the magnetic flux (illustrated as magnetic flux flow M) flown to attracted surface part 46 passes through attracted surface part 46 of yoke 41 and movable-body side fixing parts 54 and reaches attracted surface part 46 and both end parts of movable-body side fixing part 54 of plate-shaped elastic part 50-2 from both end parts of attracted surface part 46 via surface-part fixing part 44.

Thus, magnetic pole parts 242 and 244 of core assembly 20 generate attraction force F that attracts attracted surface parts 46 and 47 of yoke 41 by the principle of electromagnetic solenoid. Then, attracted surface parts 46 and 47 of yoke 41 are attracted to both of magnetic pole parts 242 and 244 of core assembly 20. Thereby, coil 22 is inserted into opening part 48 of yoke 41, and movable body 40 including yoke 41 moves in F direction against an urging force of plate-shaped elastic part 50 (see FIGS. 9A and 9B).

Further, when energization to coil 22 is stopped, the magnetic field disappears, attraction force F of core assembly 20 for movable body 40 is lost, and movable body 40 moves back to its original position (moves in −F direction) by the urging force of plate-shaped elastic part 50.

By repeating the above, electromagnetic actuator 10 enables movable body 40 to linearly reciprocate to generate vibration in the vibration direction (the Z direction).

By causing movable body 40 to linearly reciprocate, touch screen 2 as the operation device to which movable body 40 is fixed is also displaced in the Z direction following movable body 40. In the present embodiment, the displacement of movable body 40 due to driving, that is, displacement amount G1 (see FIG. 1) of touch screen 2 ranges from 0.03 mm to 0.3 mm. This displacement amount range is a range that makes it possible to give vibration corresponding to a display pressed by the operator on screen 2a of touch screen 2 as the operation device.

For example, in a case where a display to be pressed by the operator on screen 2a is a mechanical button or various switches, the displacement amount range is a range of amplitude that makes it possible to give the same haptic feeling as when the mechanical button or various switches are actually pressed. In this range, a small displacement of the amplitude of movable body 40 results in an insufficient haptic feeling and a large displacement of the amplitude of movable body 40 results in a feeling of discomfort.

Electromagnetic actuator 10 makes it possible to increase the efficiency of the magnetic circuit and to achieve a high output by disposing attracted surface parts 46 and 47 of yoke 41 in proximity to magnetic pole parts 242 and 244 of core assembly 20. Further, electromagnetic actuator 10 uses no magnet and therefore has a low-cost structure. The meander-shaped springs as plate-shaped elastic part 50 (50-1 and 50-2) enable stress dispersion and makes it possible to achieve an improvement in the reliability. In particular, since movable body 40 is supported by the plurality of plate-shaped elastic parts 50 (50-1 and 50-2), more effective stress dispersion is possible. Thus, with driving in the up-and-down direction, electromagnetic actuator 10 is capable of providing a direct feeling to the operator who comes into contact with screen 2a in the up-and-down direction.

Core assembly 20 including core 24 around which coil 22 is wound is fixed to fixing body 30, and core assembly 20 is disposed within opening part 48 of yoke 41 of movable body 40 which is movably supported in the Z direction with respect to fixing body 30 by plate-shaped elastic part 50. Thereby, members provided in the fixing body and the movable body, respectively, in order to generate magnetism to drive the movable body in the Z direction are not required to be provided in an overlapping manner in the Z direction (for example, a coil and a magnet are disposed to face each other in the Z direction). Accordingly, it is possible to reduce the thickness of the electromagnetic actuator in the Z direction. Further, by causing moving movable body 40 to linearly reciprocate without using a magnet, it is possible to give vibration as a haptic feeling to the operation device. Thus, since the support structure is simple, the design becomes simple, a space reduction can be achieved, and a reduction in the thickness of electromagnetic actuator 10 can be achieved. Further, since it is not an actuator using a magnet, a cost reduction can be achieved in comparison with a configuration in which a magnet is used.

Hereinafter, the driving principle of electromagnetic actuator 10 will be briefly described. Electromagnetic actuator 10 can also be driven by generating a resonance phenomenon by using the following motion equation and circuit equation. Note that, the operation does not involve resonance driving, but involves expressing an operation feeling of a mechanical switch displayed on touch screen 2 as the operation device. In the present embodiment, the driving is performed by supplying a driving current to coil 22 via control device 1. Examples of the mechanical switch include a tactile switch, an alternate type switch, a momentary switch, a toggle switch, a sliding switch, a rotary switch, a DIP switch, and a rocker switch.

Note that, movable body 40 in electromagnetic actuator 10 performs a reciprocating motion based on expressions 1 and 2.

[1]

$$m\frac{d^2x(t)}{dt^2} = K_f i(t) - K_{sp} x(t) - D\frac{dx(t)}{dt} \quad \text{(Expression 1)}$$

$m$:Mass $[kg]$ $x(t)$:Displacement $[m]$ $K_f$:Thrust constant $[N/A]$ $i(t)$:Current $[A]$ $K_{sp}$:Spring constant $[N/m]$ $D$:Damping coefficient $[N/(m/s)]$

[2]

$$e(t) = Ri(t) + L\frac{di(t)}{dt} + K_e \frac{dx(t)}{dt} \quad \text{(Expression 2)}$$

$e(t)$:Voltage $[V]$ $R$:Resistance $[\Omega]$

-continued

L:Inductance [H]

$K_e$:Counter electromotive force constant $[V/(rad/s)]$

That is, mass m [kg], displacement x(t) [m], thrust constant $K_f$ [N/A], current i(t) [A], spring constant $K_{sp}$ [N/m], attenuation coefficient D [N/(m/s)], and the like in electromagnetic actuator 10 can be changed as appropriate within the range satisfying expression 1. Further, voltage e(t) [V], resistance R [Ω], inductance L [H], and counter electromotive force constant $K_e$ [V/(rad/s)] can be changed as appropriate within the range satisfying expression 2.

As described above, the reciprocating motion of movable body 40 in electromagnetic actuator 10 is basically determined based on mass m of movable body 40, and spring constant $K_{sp}$ of the metal springs (elastic bodies; plate springs in the present embodiment) as plate-shaped elastic part 50.

Further, in electromagnetic actuator 10, screws 62 and 64 are used for fixing base part 32 and plate-shaped elastic part 50 and for fixing plate-shaped elastic part 50 and movable body 40. Thus, plate-shaped elastic part 50 required to be firmly fixed to fixing body 30 and movable body 40 for driving of movable body 40 can be mechanically and firmly fixed in a state that allows reworking.

Note that, although it is preferable that a plurality of plate-shaped elastic parts 50 be fixed in positions symmetrical with respect to the center of movable body 40, but as described above, one plate-shaped elastic part 50 may support movable body 40 such that movable body 40 is vibratable with respect to fixing body 30. Plate-shaped elastic part 50 may include at least two or more arm parts connecting movable body 40 and fixing body 30 and including elastic arm parts 56. Plate-shaped elastic part 50 may be formed of a magnetic material. In this case, movable-body side fixing parts 54 of plate-shaped elastic part 50 are disposed in the both end parts of core 24, respectively, in the winding axis direction of coil 22 or in the direction orthogonal to the winding axis direction. Movable-body side fixing parts 54 of plate-shaped elastic part 50 and core 24 form a magnetic path when coil 22 is energized.

Further, in the configuration of electromagnetic actuator 10, rivets may be used instead of screws 62, 64, and 68 used for fixing of base part 32 and plate-shaped elastic part 50 and for fixing of plate-shaped elastic part 50 and movable body 40. Each rivet is formed of a head part and a body part without a screw part. Rivets are inserted into holed members and the end parts of the rivets on the opposite side are plastically deformed by caulking to thereby join the holed members together. The caulking may be performed using, for example, a press machine, a dedicated tool, or the like.

<Control Device 1>

Control device 1 (the circuit in the present invention) controls electromagnetic actuator 10 that drives an operation device (touch screen 2 in FIG. 1), which is supported in an elastically vibratable manner, in one direction in a vibration direction of the operation device.

Control device 1 causes movable body 40 to elastically vibrate by supplying a driving current to coil 22 of electromagnetic actuator 10 in response to a touch operation on the operation device to generate a magnetic field and by moving movable body 40 in one direction (here, to the minus side in the Z direction) with respect to fixing body 30. Thus, when the operator comes into contact with the operation device, control device 1 gives vibration as a haptic feeling. Note that, the touch operation may be, for example, a signal indicating a touch state inputted through touch screen 2 or may be a signal detected by strain detection sensor 70.

In the present embodiment, control device 1 generates a driving signal, applies the generated driving signal to the circuit including coil 22 of electromagnetic actuator 10, and provides the driving current to coil 22.

Control device 1 applies a driving signal and provides a driving current to coil 22, and thus, movable body 40 is displaced by being drawn to a side of coil 22, that is, to the minus side in the Z direction with a magnetic attraction force against an urging force of plate-shaped elastic part 50. Following this, touch screen 2 also moves to the minus side in the Z direction with respect to base 3 to which fixing body 30 is fixed.

Further, by stopping the supply of the driving current to coil 22, the urging force is released, and a holding state of movable body 40 in a position on the minus side in the Z direction with respect to the reference position is released. Thus, movable body 40 is urged to move from its maximum displacement position on the minus side in the Z direction in the direction (the plus side in the Z direction) opposite to the direction in which movable body 40 is drawn (the minus side in the Z direction) by the urging force of the plate-shaped elastic part 50, and feeds back the vibration.

Driving signals include main driving and sub-driving signals. The main driving signal generates main vibration in response to a touch operation. The sub-driving signal adjusts an attenuation period of the vibration generated by the main driving signal.

The main driving signal is generated in control device 1 when the operator comes into contact with the operation device (screen 2a of touch screen 2 in FIG. 1). When the generated main driving signal is applied to the circuit including coil 22, a main driving current corresponding to the main driving signal is supplied to coil 22 to drive electromagnetic actuator 10. When electromagnetic actuator 10 is driven in response to the main driving signal, the main vibration to be fed back to the operator in response to the touch operation is generated.

The sub-driving signal is generated in control device 1 after the application of the main driving signal. When the generated sub-driving signal is applied to the circuit including coil 22, a sub-driving current corresponding to the sub-driving signal is supplied to coil 22 to drive electromagnetic actuator 10. When electromagnetic actuator 10 is driven in response to the sub-driving signal, vibration during an attenuation period of the vibration generated by the main driving signal, that is, vibration during the remaining attenuation period of the main vibration fed back to the operator in response to the touch operation is formed.

As described above, control device 1 applies a main driving signal to coil 22 of electromagnetic actuator 10 to start vibration of the operation device in response to a touch operation on the operation device, and then applies a sub-driving signal to coil 22 of electromagnetic actuator 10 to adjust an attenuation period of the vibration.

The main driving signal may generate vibration of any magnitude as long as the vibration constitutes the main vibration to be fed back to the operator who performs a touch operation, and may be formed by a plurality of pulses (pulse trains).

The sub-driving signal is a voltage signal to be applied after the application of the main driving signal, is a voltage signal having a waveform to be described later (for example, a sine wave or the like), and is formed of a voltage signal having one waveform or a plurality of waveforms (wave train).

In the present embodiment, sub-driving signals include braking and additional attenuation signals. The braking signal is a signal for shortening vibration that is damped after the feedback vibration by the main driving signal (an attenuation period of the vibration). The additional attenuation signal is a signal for continuing the attenuation period. Note that, as the sub-driving signal, at least one of the braking signal and the additional attenuation signal may be included.

For the main driving signal and the sub-driving signal, control device 1 generates various types of vibration forms by each amplitude, each wavelength, each supply timing, and the like, and outputs the generated various types of vibration forms as driving signals to electromagnetic actuator 10. With such driving signals, control device 1 gives the various types of vibration forms as body feelings to the operator.

Figure 10:
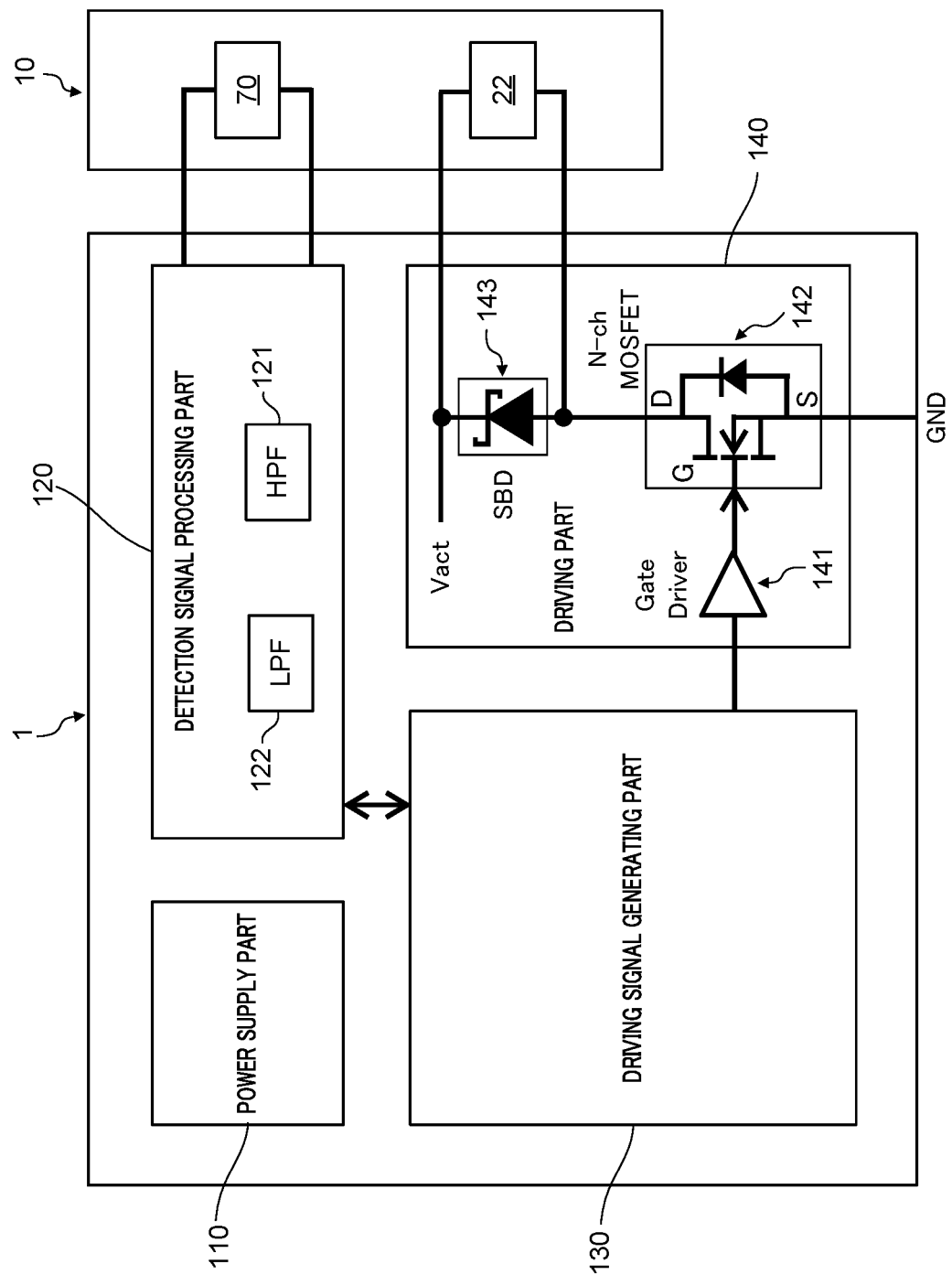
FIG. 10 is a diagram provided for describing the control device according to the embodiment of the present invention.

FIG. 10 is a diagram provided for describing control device 1 according to the embodiment of the present invention. In addition, FIG. 11 is a diagram provided for describing the generation of a driving signal in control device 1 illustrated in FIG. 10.

As illustrated in FIG. 10, control device 1 includes power supply part 110, detection signal processing part 120, driving signal generating part 130, and driving part 140.

Power supply part 110 supplies power to detection signal processing part 120, driving signal generating part 130, and driving part 140, although illustration of power supply lines or the like is omitted. Note that, in driving part 140, power supply voltage Vact of electromagnetic actuator 10 is supplied thereto via power supplied from an external power source.

A detection signal detected by strain detection sensor 70 provided in electromagnetic actuator 10 is inputted into detection signal processing part 120. Strain detection sensor 70 detects strain of plate-shaped elastic part 50 related to a push-in amount of movable body 40 due to a touch operation and/or a displacement amount of movable body due to vibration, and inputs the strain as a detection signal into detection signal processing part 120.

Detection signal processing part 120 processes an inputted detection signal. Detection signal processing part 120 includes high pass filter (HPF) 121, low pass filter (LPF) 122, and the like, performs offset removal processing and/or noise removal processing on a detection signal detected by strain detection sensor 70, and inputs the detection signal into driving signal generating part 130.

Note that, here, the detection signal detected by strain detection sensor 70 is inputted into detection signal processing part 120, but a detection signal detected by a detection part other than strain detection sensor 70 may be inputted into detection signal processing part 120 when the push-in force, acceleration, and/or displacement amount of movable body 40 can be detected.

Although details will be described later with reference to FIG. 11, driving signal generating part 130 generates a main driving signal for driving electromagnetic actuator 10 to start vibration and a sub-driving signal to be applied after the application of the main driving signal.

Driving part 140 includes gate driver 141, metal-oxide-semiconductor field-effect transistor (MOSFET) 142, and Schottky barrier diodes (SBD) 143.

Gate driver 141 is a circuit for driving and controlling MOSFET 142. Gate driver 141 amplifies and outputs a driving signal from driving signal generating part 130 and controls the voltage of gate G of MOSFET 142 to thereby drive MOSFET 142.

When a voltage is applied between gate G and source S, MOSFET 142 causes a current to flow with a conductive state between source S and drain D and performs switching or amplification of a current to be supplied to coil 22. SBD 143 is a rectifier element and prevents a flyback voltage that occurs in coil 22.

In driving part 140, driving signal generating part 130 is connected to gate G of MOSFET 142 via gate driver 141. Further, SBD 143 and coil 22 are connected in parallel, power supply voltage Vact is supplied to sides of one ends of SBD 143 and coil 22 connected in parallel, and drain D of MOSFET 142 is connected to sides of the other ends thereof. Source S of MOSFET 142 is connected to ground GND.

The generation of a driving signal in control device 1 will be described with reference to FIG. 11.

When the operator performs a touch operation on touch screen 2, a trigger signal of the touch operation is inputted into control device 1. The trigger signal may be a signal inputted through touch screen 2 on which the touch operation is performed, or may be a signal detected by strain detection sensor 70 due to the touch operation on touch screen 2. Further, as described above, the trigger signal of the touch operation may be inputted into control device 1 from a microcomputer that is a control device different from control device 1.

A trigger signal inputted through touch screen 2 or the like is inputted into main driving signal generating part B21 of driving signal generating part 130. When a trigger signal is inputted, main driving signal generating part B21 generates a main driving signal for driving electromagnetic actuator 10 to start vibration of movable body 40. The generated main driving signal is inputted into output part B25 and is inputted into gate driver 141 of driving part 140 via output part B25.

For example, as illustrated in FIGS. 16 to 22 or the like to be described later, the main driving signal is a square wave. The pulse widths and peak voltage values of square waves are inputted as parameters into a storage part of control device 1 in advance. When a trigger signal is inputted, main driving signal generating part B21 refers to the pulse widths and peak voltage values of the square waves inputted as the parameters into the storage part and generates a main driving signal. In a case where vibration presenting apparatus 200 includes a microcomputer that is a control device different from control device 1 as described above, it may be configured such that the pulse widths and peak voltage values of square waves are set on a side of the microcomputer in advance and are inputted as the parameters into the storage part of control device 1.

When a main driving signal is inputted from driving signal generating part 130 into driving part 140, driving part 140 supplies the main driving current to coil 22 by using gate driver 141 and MOSFET 142 to start the vibration of movable body 40.

When the vibration of movable body 40 starts, strain detection sensor 70 detects strain of plate-shaped elastic part 50 due to the vibration of movable body 40, and a detected detection signal is inputted into detection signal processing part 120. The strain of plate-shaped elastic part 50 is caused by a force applied by movable body 40 to plate-shaped elastic part 50 and is correlated to the acceleration of movable body 40.

Detection signal processing part 120 performs processing of shaping an inputted detection signal into an appropriate waveform. As described above, detection signal processing part 120 includes HPF 121, LPF 122, and the like, performs offset removal processing on a detection signal by using HPF part B11 of HPF 121, and performs noise removal processing by using LPF part B12 of LPF 122. Detection signal processing part 120 performs filtering processing or the like as described above, and then inputs the detection signal after the processing to timing detecting part B22 of driving signal generating part 130.

Driving signal generating part 130 includes, in addition to main driving signal generating part B21 and output part B25 that have been described above, timing detecting part B22, amplitude setting part B23, sub-driving signal generating part B24, and the like.

Timing detecting part B22 detects peak and bottom timings of a detection signal from the waveform of the detection signal inputted from detection signal processing part 120. Instead of the peak and bottom timings or in addition to the peak and bottom timings, timing detecting part B22 may detect the zero-cross timing of the detection signal.

Detection of the peak, bottom, and zero-cross timings of a detection signal by timing detecting part B22 makes it possible to supply the sub-driving signal to be described later at an appropriate supply timing. Due to differences in supply timing, the sub-driving signal becomes either a braking signal for shortening an attenuation period of vibration or an additional attenuation signal for continuing the attenuation period. The supply timing will be described later with reference to FIGS. 16 and 17.

Timing detecting part B22 inputs the detected timings described above to sub-driving signal generating part B24 via amplitude setting part B23 (or directly).

Amplitude setting part B23 sets the amplitude of a sub-driving signal based on the peak, bottom, and zero-cross timings of a detection signal inputted from timing detecting part B22. For example, amplitude setting part B23 may refer to a data table stored in the storage part of control device 1 to set the amplitude of a sub-driving signal. Amplitude setting part B23 inputs the set amplitude into sub-driving signal generating part B24.

Even when the amplitude of a sub-driving signal is increased, the braking force may not increase more than a predetermined breaking force and/or the acceleration waveform may be distorted, depending on the configuration of electromagnetic actuator 10. In such cases, the upper limit of the amplitude of a sub-driving signal may be set by using power source voltage Vact as a reference. For example, the upper limit of the amplitude of a sub-driving signal is set to 20% of power supply voltage Vact or the like. Thus, braking or addition of the attenuation period using a sub-driving signal can be performed efficiently.

Sub-driving signal generating part B24 generates a sub-driving signal based on the above-mentioned timings inputted from timing detecting part B22, the amplitude set by amplitude setting part B23, and the like.

Sub-driving signal generating part B24 includes cycle counting part B241, first sub-driving signal generating part B242 (the first waveform generating part in the present invention), second sub-driving signal generating part B243 (the second waveform generating part in the present invention), synthesizing part B244, and the like.

Cycle counting part B241 counts cycles of a sub-driving signal based on the aforementioned timings inputted from timing detecting part B22. Then, for example, cycle counting part B241 causes first sub-driving signal generating part B242 to generate a sub-driving signal in the case of an odd-numbered cycle, and causes second sub-driving signal generating part B243 to generate a sub-driving signal in the case of an even-numbered cycle.

In a case where a sub-driving signal having an odd-numbered cycle and a sub-driving signal having an even-numbered cycle are generated by using one first sub-driving signal generating part B242, it is difficult to switch from a preceding sub-driving signal to the next sub-driving signal. For example, a sub-driving signal may be interrupted or a sudden change may occur at the time of the switching.

Accordingly, in the present embodiment, sub-driving signal generating part B24 includes two sub-driving signal generating parts as first sub-driving signal generating part B242 and second sub-driving signal generating part B243, and synthesizing part B244. Although details will be described with reference to FIG. 13, sub-driving signals having odd-numbered and even-numbered cycles generated in two sub-driving signal generating parts as first sub-driving signal generating part B242 and second sub-driving signal generating part B243, respectively, are synthesized by synthesizing part B244. Thus, by synthesizing sub-driving signals having odd-numbered and even-numbered cycles, the switching from a preceding sub-driving signal to the next sub-driving signal becomes a smooth change even when there is a period during which the preceding sub-driving signal and the next sub-driving signal overlap. For example, when the cycle of vibration of movable body 40 is T, the switching from a preceding sub-driving signal to the next sub-driving signal can be a smooth change by the synthesis to be described below in a case where the cycle of the sub-driving signal is greater than 1T.

Further, in the present embodiment, each of two sub-driving signal generating parts as first sub-driving signal generating part B242 and second sub-driving signal generating part B243 is a sine wave generator. First sub-driving signal generating part B242 and second sub-driving signal generating part B243 generate a sine wave (sine wave) as the sub-driving signal.

Note that, the sine wave is an example of the sub-driving signal, and may be a waveform that approximates to a sine waveform, for example, a waveform such as a cosine wave. Such a sub-driving signal preferably has a variable voltage that varies with an offset voltage, as the center value, offset from a zero voltage. A waveform that indicates a variation in the variable voltage is curvilinear, for example, desirably a sine function curve or a cosine function curve. Further, the sub-driving signal desirably has a variable voltage that varies in a range in which the polarity of the variable voltage does not change.

Although details will be described with reference to FIGS. 16 to 28, in the example indicated in the present embodiment, the sub-driving signal is a sine wave or cosine wave having a variable voltage whose center value is an offset voltage offset from a zero voltage and which varies curvilinearly in a range in which the polarity of the variable voltage does not change.

As described above, since the sub-driving signal has a variable voltage whose center value is an offset voltage and which varies curvilinearly in a range in which the polarity of the variable voltage does not change, the sub-driving current corresponding to the above sub-driving signal also varies curvilinearly and flows through coil 22. As described above, there is no discontinuous variation in a sub-driving current. For this reason, in every period of a vibration cycle, an attraction force (driving force) due to coil 22 varies curvilinearly at a predetermined value or more. As described above, since the attraction force varies curvilinearly at a predetermined value or more, it is possible to suppress generation of harmonic vibration due to a discontinuous variation in the attraction force and the generation of an abnormal noise due to the above. Here, "discontinuous variation" refers to interruption of a current or force or to a variation in the shape of a triangular wave, in a sub-driving current or an attractive force.

As described above, synthesizing part B244 synthesizes sub-driving signals having odd-numbered and even-numbered cycles generated by two sub-driving signal generating parts as first sub-driving signal generating part B242 and second sub-driving signal generating part B243, respectively, generates a wave train of a sub-driving signal, and inputs the wave train into output part B25.

Figure 12A:
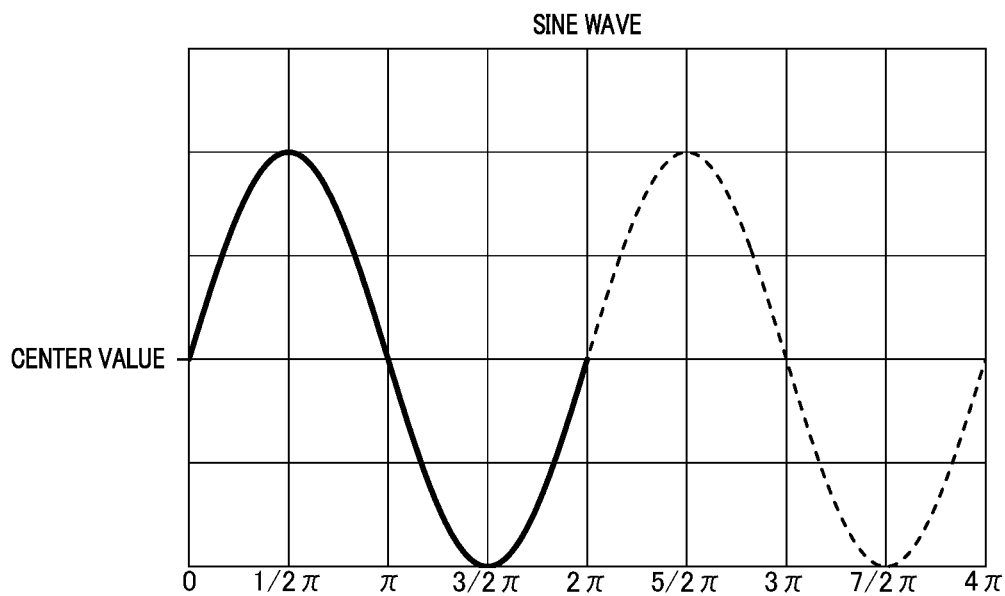
FIG. 12A is a graph illustrating a sine wave whose initial phase is 0.
Figure 12B:
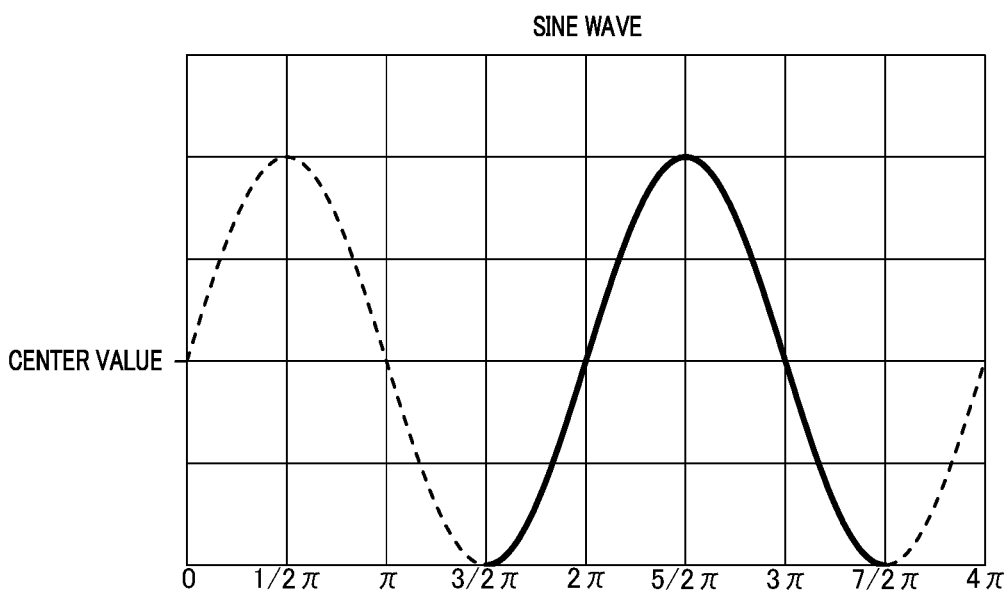
FIG. 12B is a graph illustrating a sine wave whose initial phase is 3/2π.

Here, in the present embodiment, the sine and cosine waves generated by first sub-driving signal generating part B242 and second sub-driving signal generating part B243 will be described with reference to FIGS. 12A to 12C. FIG. 12A is a graph illustrating a sine wave whose initial phase is 0. Further, FIG. 12B is a graph illustrating a sine wave whose initial phase is $3/2\pi$. Further, FIG. 12C is a graph illustrating a cosine wave whose initial phase is $\pi$.

In the present embodiment, first sub-driving signal generating part B242 and second sub-driving signal generating part B243 generates, as a basic waveform constituting a sub-driving signal, a one-cycle sine wave which is indicated with the thick line in FIG. 12A and whose initial phase is 0. Then, first sub-driving signal generating part B242 generates a wave train of sine waves having odd-numbered cycles and second sub-driving signal generating part B243 generates a wave train of sine waves having even-numbered cycles. Synthesizing part B244 synthesizes the wave train of sine waves having odd-numbered cycles generated by first sub-driving signal generating part B242 and the wave train of sine waves having even-numbered cycles generated by second sub-driving signal generating part B243 to generate a wave train of a sub-driving signal as those illustrated in FIGS. 16 and 17 to be described later. The basic waveform described above may be, instead of the one-cycle sine wave which is indicated in FIG. 12A and whose initial phase is 0, a waveform equivalent thereto. For example, the basic waveform described above may be a waveform including both a waveform in which the voltage becomes negative by a second derivative (for example, the period of 0 to $\pi$ in FIG. 12A) and, conversely, a waveform in which the voltage becomes positive by a second derivative (for example, the period of $\pi$ to $2\pi$ in FIG. 12A).

Figure 13:
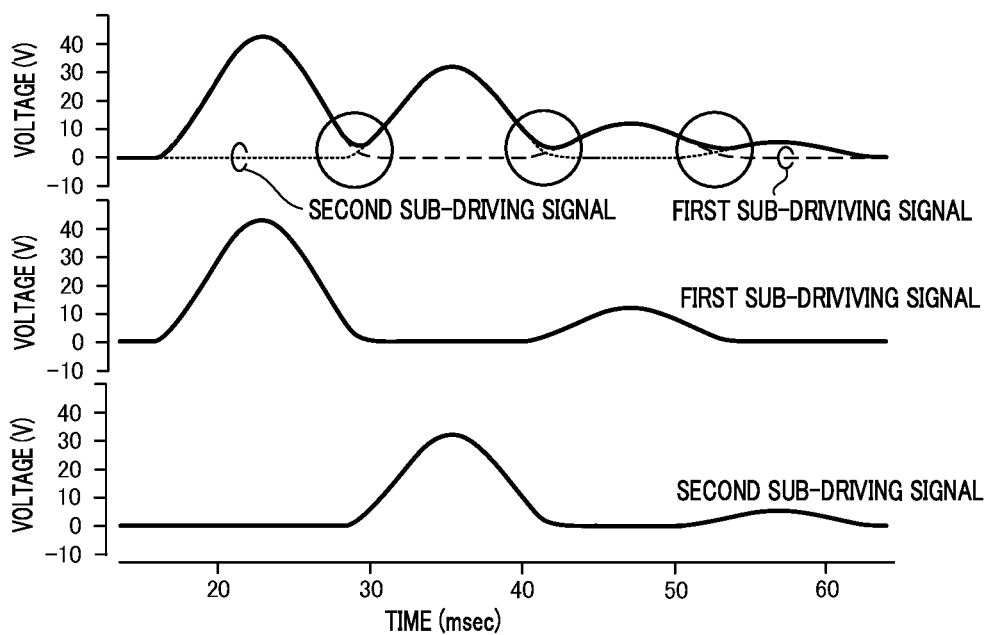
FIG. 13 is a graph provided for describing a synthesis of a wave train formed of sine waves having odd-numbered cycles and a wave train formed of sine waves having even-numbered cycles.

Further, first sub-driving signal generating part B242 and second sub-driving signal generating part B243 may generate, as the basic waveform constituting a sub-driving signal, a one-cycle sine wave which is indicated with the thick line in FIG. 12B and whose initial phase is $3/2\pi$. In other words, a sine wave between a trough and a trough may be used as the basic waveform. Then, first sub-driving signal generating part B242 generates a wave train of sine waves having odd-numbered cycles and second sub-driving signal generating part B243 generates a wave train of sine waves having even-numbered cycles. Synthesizing part B244 synthesizes the wave train of sine waves having odd-numbered cycles generated by first sub-driving signal generating part B242 and the wave train of sine waves having even-numbered cycles generated by second sub-driving signal generating part B243 to generate a wave train of a sub-driving signal as illustrated in FIG. 13 to be described later. The basic waveform described above may be, instead of the one-cycle sine wave which is indicated in FIG. 12B and whose initial phase is $3/2\pi$, a waveform equivalent thereto. For example, the basic waveform described above may be a waveform including both a waveform in which the voltage becomes negative by a second derivative (for example, the period of $2\pi$ to $3\pi$ in FIG. 12B) and, conversely, a waveform in which the voltage becomes positive by a second derivative (for example, the period of $3/2\pi$ to $2\pi$ and the period of $3\pi$ to $7/2\pi$ in FIG. 12B).

Figure 12C:
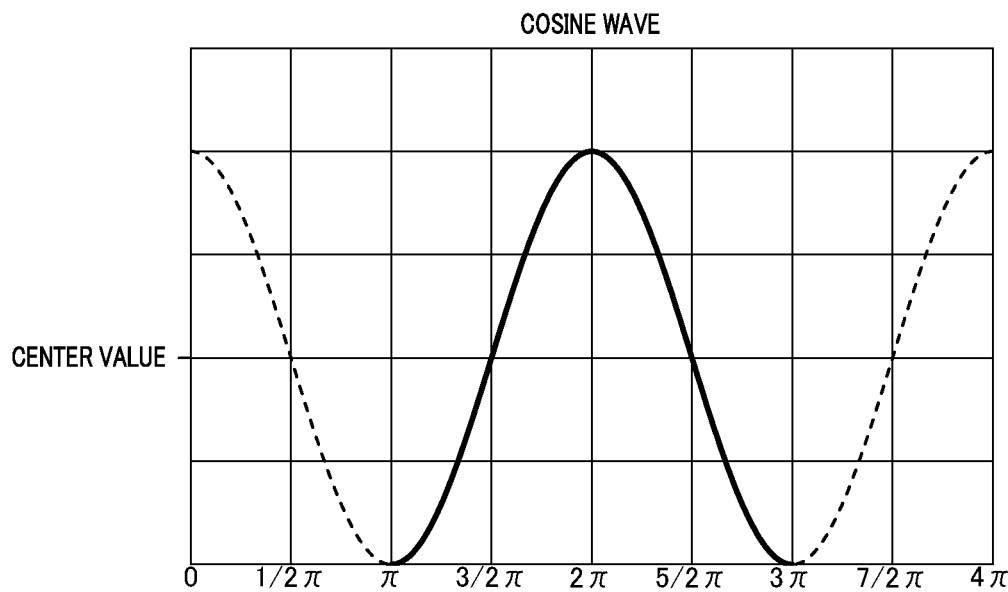
FIG. 12C is a graph illustrating a cosine wave whose initial phase is π.

Note that, first sub-driving signal generating part B242 and second sub-driving signal generating part B243 may generate, as the basic waveform constituting a sub-driving signal, a one-cycle cosine wave which is indicated with the thick line in FIG. 12C and whose initial phase is $\pi$, instead of the one-cycle sine wave which is indicated in FIG. 12B and whose initial phase is $3/2\pi$. That is, a cosine wave between a trough and a trough may be used as the basic waveform. The basic waveform in this case may be, instead of the one-cycle cosine wave which is indicated in FIG. 12C and whose initial phase is $\pi$, a waveform equivalent thereto. For example, the basic waveform described above may be a waveform including both a waveform in which the voltage becomes negative by a second derivative (for example, the period of $3/2\pi$ to $5/2\pi$ in FIG. 12C) and, conversely, a waveform in which the voltage becomes positive by a second derivative (for example, the period of $\pi$ to $3/2\pi$ and the period of $5/2\pi$ to $3\pi$ in FIG. 12C).

The synthesis of wave trains of sine waves having odd-numbered and even-numbered cycles generated by two sub-driving signal generating parts as first sub-driving signal generating part B242 and second sub-driving signal generating part B243, respectively, will be described with reference to FIG. 13. FIG. 13 is a graph provided for describing a synthesis of a wave train formed of sine waves having odd-numbered cycles and a wave train formed of sine waves having even-numbered cycles. Here, it is assumed that the basic waveform of sub-driving signals generated by first sub-driving signal generating part B242 and second sub-driving signal generating part B243 is the one-cycle sine wave which is indicated in FIG. 12B and whose initial phase is $3/2\pi$.

In FIG. 13, the middle portion of the graph is a graph illustrating a wave train (first sub-driving signal) formed of sine waves having odd-numbered cycles generated by first sub-driving signal generating part B242. The lower portion of the graph is a graph illustrating a wave train (second sub-driving signal) formed of sine waves having even-numbered cycles generated by second sub-driving signal generating part B243.

First sub-driving signal generating part B242 generates a wave train formed of sine waves having odd-numbered cycles, and second sub-driving signal generating part B243 generates a wave train formed of sine waves having even-numbered cycles. Then, synthesizing part B244 synthesizes the wave train formed of sine waves having odd-numbered cycles generated by first sub-driving signal generating part B242 and the wave train formed of sine waves having even-numbered cycles generated by second sub-driving signal generating part B243 to generate a wave train of a sub-driving signal illustrated in the upper portion of the graph. Synthesizing part B244 superposes the wave train formed of sine waves having odd-numbered cycles and the wave train formed of sine waves having even-numbered cycles on each other. Thus, portions at which a sine wave having an odd-numbered cycle switches to a sine wave having an even-numbered cycle and portions at which a sine wave having an even-numbered cycle switches to a sine wave having an odd-numbered cycle (the portions of the circles in FIG. 13) can have a smooth waveform.

Output part B25 outputs main driving and sub-driving signals, which serve as driving signals, to driving part 140. Output part B25 includes a pulse width modulation (PWM) circuit and controls, in the case of outputting a main driving signal, controls the duty cycle of a square wave such that the square wave has a set amplitude. Then, output part B25 outputs the main driving signal, whose amplitude and pulse width are set, to driving part 140. In the case of outputting a sub-driving signal, on the other hand, output part B25, outputs a sub-driving signal generated by sub-driving signal generating part B24 to driving part 140.

With the above configuration, control device 1 generates a driving signal for driving the operation device (touch screen 2) in response to a touch operation on the operation device, and supplies a driving current corresponding to the driving signal to coil 22 of electromagnetic actuator 10.

Note that, in control device 1, driving signal generating part 130 may include a central processing unit (CPU), a read only memory (ROM), a random access memory (RAM), a storage part, and the like. The CPU reads a program corresponding to a processing content from the ROM, develops the program in the RAM, and cooperates with the developed program to generate main driving and sub-driving signals.

The storage part may be formed of, for example, a non-volatile semiconductor memory (so-called flash memory) or the like, and the CPU may generate main driving and sub-driving signals by referring to various data stored in the storage part. The various data include the above-described data table used for setting the amplitude of a sub-driving signal, or the like, and may include waveform data of sub-driving signals as illustrated in FIGS. 16 to 28 to be described later.

Further, the ROM stores not only a program for generating main driving and sub-driving signals, but also various programs such as vibration presentation programs as the vibration presenting apparatus for presenting vibration by driving electromagnetic actuator 10.

The vibration presentation programs include a program that is used to generate a driving signal for generating vibration corresponding to touch information indicating a touch state of a touch operation when the touch information is inputted from touch screen 2 or strain detection sensor 70, and to output the driving signal to electromagnetic actuator 10 via driving part 140. For example, the pulse width, peak voltage value, and the like of a main driving signal corresponding to the touch information and the timing, amplitude, and the like of a sub-driving signal corresponding to the touch information are set according to the above program. Then, the main driving and sub-driving signals generated with these settings are outputted to electromagnetic actuator 10 via driving part 140.

<Vibration Operation Caused by Control Device 1>

Control device 1 supplies a main driving current corresponding to a main driving signal to coil 22 to drive movable body 40 in one direction of the vibration direction. When the main driving current is supplied to coil 22, an attraction force due to coil 22 occurs, and this attraction force causes movable body 40 to be displaced in the one direction of the vibration direction against an urging force of plate-shaped elastic part 50. When the main driving current is continuously supplied, movable body 40 will continue to be displaced in the one direction of the vibration direction, but when the urging force of plate-shaped elastic part 50 is greater than the attraction force due to coil 22, the urging force will cause movable body 40 to be displaced in the direction opposite to the one direction described above. By stopping the supply of the main driving current at this timing, the attraction force that will cause movable body 40 to be displaced in the one direction described above is released, and movable body 40 is displaced in the opposite direction due to the urging force. Thus, the main vibration due to the main driving current occurs in movable body 40.

In the present embodiment, as an example, the main driving signal is a square wave, and the stop of the supply of the corresponding main driving current means a timing at which the voltage of the main driving signal for generating the driving current is turned off, that is, a timing at which the square wave of the main driving signal falls. At the timing at which the voltage is turned off, the driving current is not completely off, but is in a state of being damped. Movable body 40 is displaced by moving to the other direction (the plus side in the Z direction) of the vibration direction by an urging force of plate-shaped elastic part 50 accumulated in a maximum displaceable position in a direction in which movable body 40 is drawn (the minus side in the Z direction). A strong vibration is propagated to the operation device via movable body 40 which has moved to a side of the other direction, which is a side of the operation device, and a haptic feeling is given to the operator.

When the operator comes into contact with and operates screen 2a of touch screen 2, for example, the above-described microcomputer generates a trigger signal in response to the touch of the operator with screen 2a and inputs the trigger signal into control device 1. With the input of the trigger signal, control device 1 first supplies a main driving current corresponding to a main driving signal to coil 22, and then supplies a sub-driving current corresponding to a sub-driving signal (braking signal, additional attenuation signal) to coil 22. Control device 1 supplies the main driving current corresponding to the main driving signal to coil 22, and additionally adjusts vibration of movable body 40 remaining after the stop of the supply of the main driving current, a so-called vibration attenuation period, with the sub-driving current corresponding to the sub-driving signal to be supplied after the main driving current is supplied.

<Supply of Main Driving Current Corresponding to Main Driving Signal>

As described above, when the operator comes into contact with and operates screen 2a of touch screen 2, for example, a microcomputer generates a trigger signal in response to the touch of the operator with screen 2a and inputs the trigger signal into control device 1. With the input of the trigger signal, control device 1 supplies a main driving current corresponding to a main driving signal to coil 22. Thus, movable body 40 is driven and vibrates in response to the main driving current, and a vibration attenuation period occurs. Control device 1 gives various types of haptic feelings when the operator comes into contact with the operation device, by adjusting, with the main driving signal, the strength during a vibration attenuation period, the length of a vibration attenuation period, the presence or absence of a vibration attenuation period, or the like.

Here, it is assumed that the mass of movable body 40 (also including touch screen 2, but here, a description will be given with movable body 40 for convenience) as a movable portion is m and the spring constant of the plate spring as plate-shaped elastic part 50 that elastically supports movable body 40 is $K_{sp}$. Vibration cycle T in electromagnetic actuator 10 is expressed by following expression 3.

[3]

$$T = 2\pi\sqrt{\frac{m}{K_{sp}}}$$ (Expression 3)

In the present embodiment, vibration cycle T is a time interval between the timing of the maximum displacement on a negative side and the timing of the maximum displacement on the next negative side.

<Supply of Sub-Driving Current Corresponding to Sub-Driving Signal>

Control device 1 supplies a main driving current corresponding to a main driving signal to coil 22, and then supplies a sub-driving current corresponding to a sub-driving signal (braking signal, additional attenuation signal) to coil 22 at a predetermined supply timing. In other words, control device 1 supplies a main driving current, with which elastic vibration can be started, to coil 22, and then supplies a sub-driving current, with which an attenuation period of the elastic vibration can be adjusted, to coil 22. The predetermined supply timing will be described later.

The attenuation period of the vibration due to the main driving current is adjusted by supplying the sub-driving current to coil 22. That is, the sub-driving current corresponding to the sub-driving signal adjusts the magnitude and length of vibration following the main vibration due to the main driving current corresponding to the main driving signal.

Vibration cycle $T_d$ of vibration in the attenuation period of the main vibration due to the main driving current is expressed by following expression 4 where $\omega_0$ is the natural angular frequency and $\zeta$ is the attenuation ratio.

[4]
$$T_d = \frac{2\pi}{\omega_d}, \omega_d = \omega_0 \sqrt{(1-\zeta^2)}, \omega_0 = \sqrt{\frac{K_{sp}}{m}}, \zeta = \frac{D}{2\sqrt{K_{sp}m}} \quad \text{(Expression 4)}$$

Vibration cycle $T_d$ is greater than vibration cycle T described above. Further, in a case where a braking signal is applied as the sub-driving signal, attenuation ratio $\zeta$ substantially increases, and vibration cycle $T_d$ further increases. Accordingly, for matching vibration cycle $T_d$ above, vibration cycle $T_d$ due to the sub-driving signal is caused to be greater than vibration cycle T. For example, when $T_d$=nT, n is caused to be greater than 1.

In a case where an additional attenuation signal is applied as the sub-driving signal, on the other hand, attenuation ratio $\zeta$ substantially decreases and vibration cycle $T_d$ is smaller than vibration cycle T. Accordingly, for matching vibration cycle $T_d$ above, vibration cycle $T_d$ due to the sub-driving signal is caused to be smaller than vibration cycle T. For example, when $T_d$=nT, n is caused to be smaller than 1.

Figure 14:
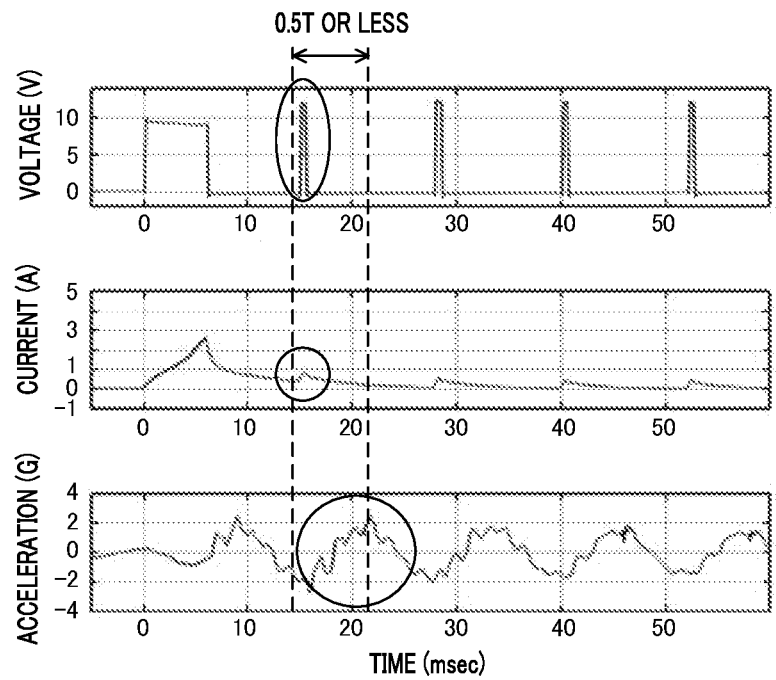
FIG. 14 is a graph provided for describing a harmonic generated in a case where a sub-driving signal (additional attenuation signal) of a square wave is applied from the control device.
Figure 15:
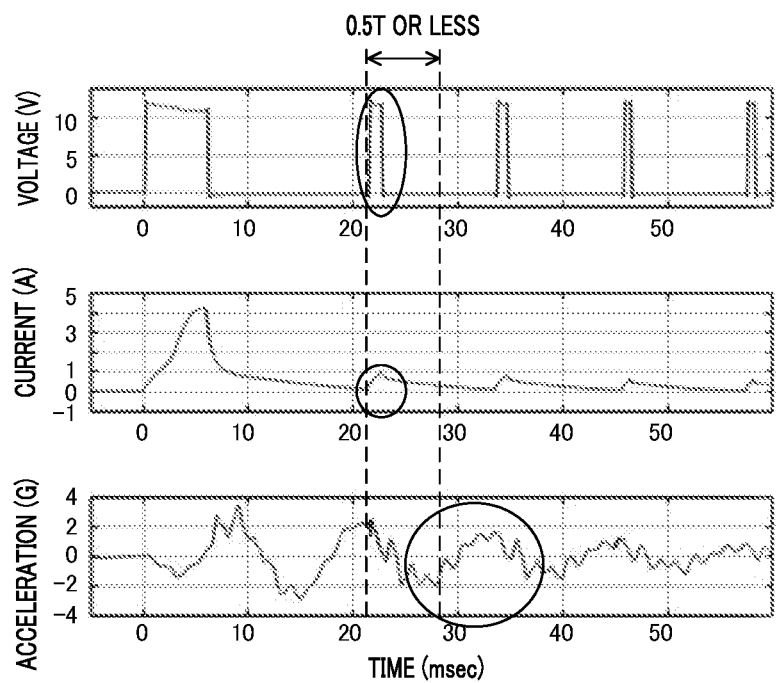
FIG. 15 is a graph provided for describing a harmonic generated in a case where a sub-driving signal (braking signal) of a square wave is applied from the control device.

Here, a case where a square wave is used as the sub-driving signal will be described with reference to FIGS. 14 and 15. FIG. 14 is a graph provided for describing a harmonic generated in a case where a sub-driving signal (additional attenuation signal) of a square wave is applied from control device 1. Further, FIG. 15 is a graph provided for describing a harmonic generated in a case where a sub-driving signal (braking signal) of a square wave is applied from control device 1.

FIG. 14 is a graph illustrating the current flowing through coil 22 and the acceleration of movable body 40 when a main driving signal corresponding to a touch operation is applied as a square wave from control device 1 and a sub-driving signal serving as an additional attenuation signal is also applied as a square wave from control device 1. The sub-driving signal is supplied at a supply timing at which the sub-driving signal serves as an additional attenuation signal for continuing an attenuation period of vibration. Further, the acceleration of movable body 40 is calculated from a detection signal detected by strain detection sensor 70.

As illustrated in FIG. 14, when a main driving signal of a square wave is applied from control device 1, a main driving current corresponding to the main driving signal of the square wave flows through coil 22, and main vibration occurs in movable body 40. The acceleration of movable body 40 also varies following the vibration thereof as illustrated in FIG. 14.

Then, as illustrated in the ellipses in FIG. 14, when a sub-driving signal of a square wave, which serves as an additional attenuation signal, is applied from control device 1, a sub-driving current corresponding to the sub-driving signal of the square wave flows through coil 22. At this time, the current flowing through coil 22 discontinuously varies at the time of application of the sub-driving signal of the square wave and at the time of the stop of the application thereof, and harmonics are superimposed on the acceleration waveform of the vibration of movable body 40 due to the discontinuous variation in the current. The superimposition of such harmonics on the acceleration waveform of the vibration causes an unpleasant haptic feeling and an abnormal noise.

The same applies to a case where a braking signal is applied as the sub-driving signal. FIG. 15 is a graph illustrating the current flowing through coil 22 and the acceleration of movable body 40 when a main driving signal corresponding to a touch operation is applied as a square wave from control device 1 and a sub-driving signal serving as a braking signal is also applied as a square wave from control device 1. The sub-driving signal is supplied at a supply timing at which the sub-driving signal serves as a braking signal for shortening an attenuation period of vibration.

As illustrated in FIG. 15, when a main driving signal of a square wave is applied from control device 1, a main driving current corresponding to the main driving signal of the square wave flows through coil 22, and main vibration occurs in movable body 40. The acceleration of movable body 40 also varies following the vibration thereof as illustrated in FIG. 15.

Then, as illustrated in the ellipses in FIG. 15, when a sub-driving signal of a square wave, which serves as a braking signal, is applied from control device 1, a sub-driving current corresponding to the sub-driving signal of the square wave flows through coil 22. At this time, the current flowing through coil 22 varies at the time of application of the sub-driving signal of the square wave and at the time of the stop of the application thereof, and harmonics are superimposed on the acceleration waveform of the vibration of movable body due to the variation in the current. The superimposition of such harmonics on the acceleration waveform of the vibration causes an unpleasant haptic feeling and an abnormal noise.

As described above, when a square wave is used as the sub-driving signal, a harmonic is generated and the harmonic is superimposed on the acceleration waveform of vibration, which causes an unpleasant feeling and an abnormal noise.

In a case where a square wave is used as the sub-driving signal, the pulse width of the square wave is 0.5 T or less, where T is the vibration cycle of movable body 40, in order to cause the square wave to function as an additional attenuation signal or a braking signal. In addition, the generation of a harmonic cannot be suppressed even when the pulse width is widened or narrowed within the range of 0.5T or less.

In terms of the suppression of the generation of a harmonic, it has been found as a result the study of the present inventors and others that the generation of a harmonic can be suppressed by using a sub-driving signal having a variable voltage that varies in a curvilinear waveform with, as the center value, an offset voltage offset from a zero voltage, for example, by using a sub-driving signal of a sine wave.

Figure 16:
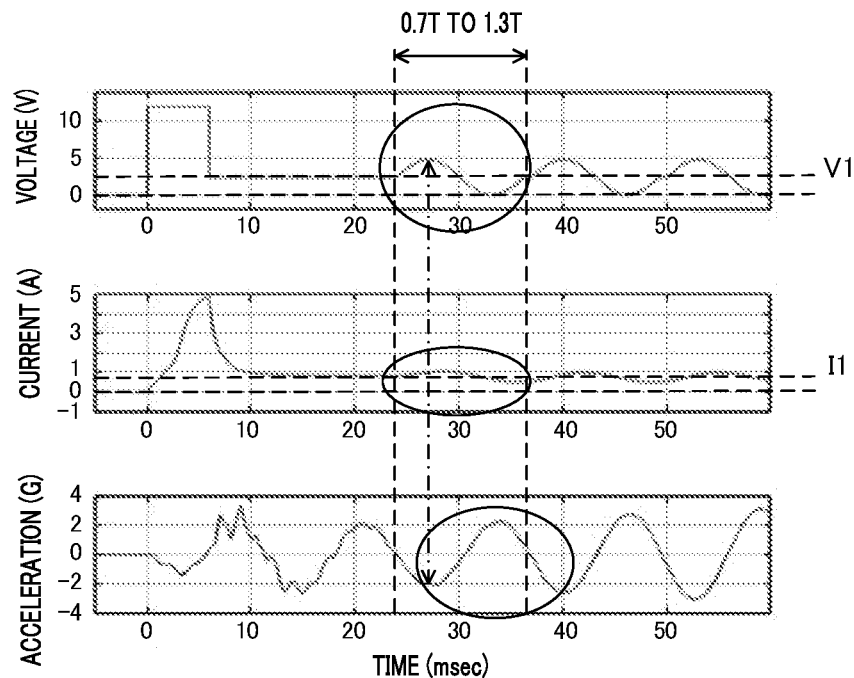
FIG. 16 is a graph provided for describing a harmonic generated in a case where a sub-driving signal (additional attenuation signal) of a sine wave is applied from the control device.
Figure 17:
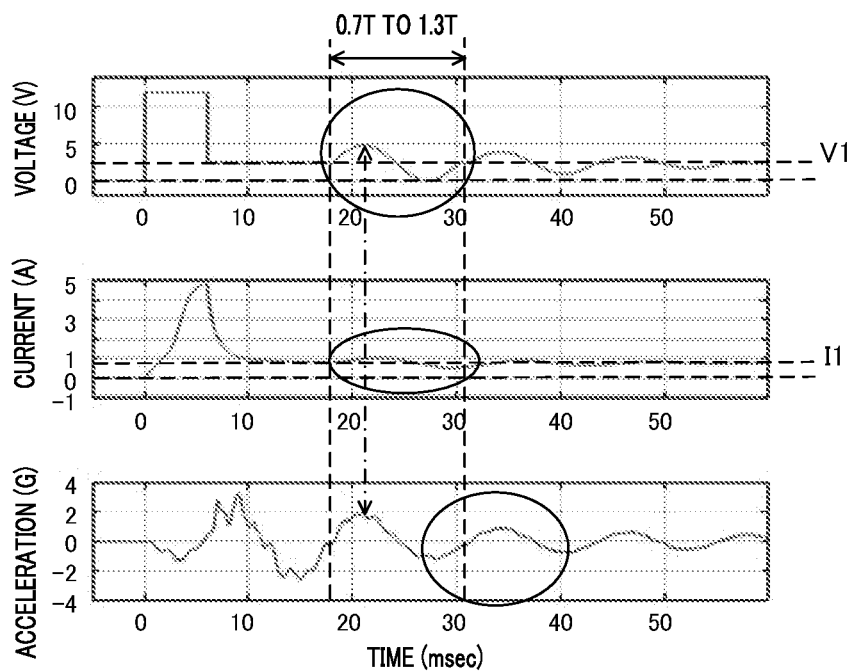
FIG. 17 is a graph provided for describing a harmonic generated in a case where a sub-driving signal (braking signal) of a sine wave is applied from the control device.

FIG. 16 is a graph provided for describing a case where a sub-driving signal (additional attenuation signal) of a sine wave is applied from control device 1. Further, FIG. 17 is a graph provided for describing a case where a sub-driving signal (braking signal) of a sine wave is applied from control device 1. Hereinafter, a description will be given with a sub-driving signal of a sine wave or a cosine wave as an example of the sub-driving signal having a variable voltage that varies in a curvilinear waveform with an offset voltage as the center value.

FIG. 16 is a graph illustrating the current flowing through coil 22 and the acceleration of movable body 40 when a square wave is applied as a main driving signal corresponding to a touch operation from control device 1 and a wave train of sine waves is applied as a sub-driving signal serving as an additional attenuation signal from control device 1.

The sub-driving signal is supplied at a supply timing at which the sub-driving signal serves as an additional attenuation signal for continuing an attenuation period of vibration. As the supply timing, the position of the maximum value of the waveform within one cycle of the sub-driving signal (the peak value of the crest side) is caused to be simultaneous with the negative peak position of the acceleration at the time of the vibration of movable body (the position in which movable body 40 is farthest from coil 22) (see the arrows in the one-dot chain line in FIG. 16). Further, these positions are not necessarily simultaneous, but may be substantially simultaneous. Control device 1 controls the sub-driving signal such that such a supply timing is realized.

In the present embodiment, the direction in which movable body 40 moves away from coil 22 is used as the positive direction. The acceleration is the derivative of the velocity, the velocity is the derivative of the position, and the acceleration is in antiphase to the position, and thus, the timing of the negative peak position of the acceleration coincides with the timing of the position in which movable body 40 is farthest from coil 22. Conversely, the timing of the positive peak position of the acceleration to be described later coincides with the timing of the position in which movable body 40 is nearest to coil 22.

In a case where the inductance of the load (coil 22) is large, the phase difference between the sub-driving signal (voltage) and the sub-driving current corresponding to the sub-driving signal is large (approximately 90°). For this reason, the sub-driving signal may be supplied at the supply timing described above. In a case where the inductance of the load is small, on the other hand, the phase difference between the sub-driving signal and the sub-driving current becomes smaller. For this reason, the sub-driving signal is controlled such that the position of the maximum value within one period of a sub-driving current, which flows through coil 22 due to the sub-driving signal, or a magnetic attraction force, which occurs in electromagnetic actuator 10 (core assembly 20) due to the sub-driving signal, is simultaneous or substantially simultaneous with the negative peak position of the velocity. In any case, it is desirable to control the sub-driving signal such that the position of the maximum value within one period of a sub-driving current, which flows through coil 22 due to the sub-driving signal, or a magnetic attraction force, which occurs in electromagnetic actuator 10 due to the sub-driving signal, is simultaneous or substantially simultaneous with the negative peak position of the velocity.

Further, the sub-driving signal is a wave train of sine waves having, as the center value, offset voltage V1 offset from a zero voltage. In the wave train of sine waves, the variable voltage varies curvilinearly in a range in which the polarity of the variable voltage does not change, and the basic waveform thereof is a one-cycle sine wave with the initial phase of 0 (see FIG. 12A). Here, the amplitude of the sub-driving signal in each cycle is the same amplitude. Further, offset voltage V1 is also applied during a period between a main driving signal and a sub-driving signal.

As illustrated in FIG. 16, when a main driving signal of a square wave is applied from control device 1, a main driving current corresponding to the main driving signal of the square wave flows through coil 22, and main vibration occurs in movable body 40. The acceleration of movable body 40 also varies following the vibration thereof as illustrated in FIG. 16.

Then, as illustrated in the ellipses in FIG. 16, when a sub-driving signal of a sine wave, which serves as an additional attenuation signal, is applied from control device 1, a sub-driving current corresponding to the sub-driving signal of the sine wave flows through coil 22.

The sub-driving current flowing through coil 22 becomes, in response to a variation in the variable voltage in the sub-driving signal of the sine wave, a variable current that changes with offset current I1 corresponding to offset voltage V1 as the center value. The waveform indicating changes in the variable current is curvilinear and there is no discontinuous variation. In fact, in the sub-driving current illustrated in FIG. 16, unlike the sub-driving current illustrated in FIG. 14, there is no discontinuous variation in the waveform indicating changes in the variable current.

When such a sub-driving current flows through coil 22, an attraction force that varies curvilinearly at a predetermined value or more acts on movable body 40 over the entire period of the vibration cycle. Thus, since the attraction force varies curvilinearly at a predetermined value or more, that is, since no discontinuous variation in the attraction force is caused to occur, it is possible to suppress the generation of a harmonic due to a discontinuous variation in the attraction force. Such an attraction force may be represented by, for example, a sinusoidal function. In addition, it can be seen in FIG. 16 that no harmonic superimposed on the acceleration waveform of the vibration of movable body 40 appears and the generation of a harmonic can be suppressed.

With the sub-driving current described above, an attraction force at a predetermined value or more acts on the vibration of movable body 40 over the entire period of the vibration cycle. In other words, movable body 40 is in a state of being attracted to a side of coil 22 over the entire period of the vibration cycle, and the vibration center in this case is in a state of being shifted to the side of coil 22 from the vibration center in a case where movable body freely vibrates.

Then, here, in such a state, a sub-driving voltage of a sine wave having offset voltage V1 as the center value is applied to coil 22 such that the position of the maximum value within one cycle is simultaneous or substantially simultaneous with the negative peak position of the acceleration at the time of the vibration of movable body 40. That is, a voltage of a sub-driving signal, which is higher than offset voltage V1, is applied to coil 22 when movable body 40 that has started vibration is displaced in a direction to coil 22. For this reason, coil 22 can attract movable body 40, which is displaced in the direction to coil 22, and accelerate the displacement of movable body 40 to extend a vibration attenuation period.

Note that, in view of the inductance of coil 22, the sub-driving signal may be controlled such that the position of the maximum value within one period of a sub-driving current, which flows through coil 22 due to the sub-driving signal, or a magnetic attraction force, which occurs in electromagnetic actuator 10 due to the sub-driving signal, is simultaneous or substantially simultaneous with the negative peak position of the velocity.

The same applies to a case where a braking signal is applied as the sub-driving signal. FIG. 17 is a graph illustrating the current flowing through coil 22 and the acceleration of movable body 40 when a square wave is applied as a main driving signal corresponding to a touch operation from control device 1 and a wave train of sine waves is applied as a sub-driving signal serving as a braking signal from control device 1.

The sub-driving signal is supplied at a supply timing at which the sub-driving signal serves as a braking signal for shortening an attenuation period of vibration. As the supply timing, the position of the maximum value of the waveform within one cycle of the sub-driving signal (the peak value of the crest side) is caused to be simultaneous with the positive peak position of the acceleration at the time of the vibration of movable body 40 (the position in which movable body 40 is nearest to coil 22) (see the arrows in the one-dot chain line in FIG. 17). Further, these positions are not necessarily simultaneous, but may be substantially simultaneous. Control device 1 controls the sub-driving signal such that such a supply timing is realized.

Note that, in view of the inductance of coil 22, the sub-driving signal may be controlled such that the position of the maximum value within one period of a sub-driving current, which flows through coil 22 due to the sub-driving signal, or a magnetic attraction force, which occurs in electromagnetic actuator 10 due to the sub-driving signal, is simultaneous or substantially simultaneous with the positive peak position of the velocity.

Further, the sub-driving signal is a wave train of sine waves having, as the center value, offset voltage V1 offset from a zero voltage. In the wave train of sine waves, the variable voltage varies curvilinearly in a range in which the polarity of the variable voltage does not change, and the basic waveform thereof is a one-cycle sine wave with the initial phase of 0 (see FIG. 12A). Here, the amplitude of the sub-driving signal in each cycle is gradually reduced. Further, offset voltage V1 is also applied during a period between a main driving signal and a sub-driving signal.

As illustrated in FIG. 17, when a main driving signal of a square wave is applied from control device 1, a main driving current corresponding to the main driving signal of the square wave flows through coil 22, and main vibration occurs in movable body 40. The acceleration of movable body 40 also varies following the vibration thereof as illustrated in FIG. 17.

Then, as illustrated in the ellipses in FIG. 17, when a sub-driving signal of a sine wave, which serves as a braking signal, is applied from control device 1, a sub-driving current corresponding to the sub-driving signal of the sine wave flows through coil 22.

The sub-driving current flowing through coil 22 becomes, in response to a variation in the variable voltage in the sub-driving signal of the sine wave, a variable current that changes with offset current I1 corresponding to offset voltage V1 as the center value. The waveform indicating changes in the variable current is curvilinear and there is no discontinuous variation. In fact, in the sub-driving current illustrated in FIG. 17, unlike the sub-driving current illustrated in FIG. 14, there is no discontinuous variation in the waveform indicating changes in the variable current.

When such a sub-driving current flows through coil 22, an attraction force that varies curvilinearly at a predetermined value or more acts on movable body 40 over the entire period of the vibration cycle. Thus, since the attraction force varies curvilinearly at a predetermined value or more, that is, since no discontinuous variation in the attraction force is caused to occur, it is possible to suppress the generation of a harmonic due to a discontinuous variation in the attraction force. It can be seen in FIG. 17 that no harmonic superimposed on the acceleration waveform of the vibration of movable body 40 appears and the generation of a harmonic can be suppressed.

Here, the vibration center of movable body 40 is also in a state of being shifted to the side of coil 22 from the vibration center in a case where movable body 40 freely vibrates as described above.

Then, here, in such a state, a sub-driving voltage of a sine wave having offset voltage V1 as the center value is applied to coil 22 such that the position of the maximum value within one cycle is simultaneous or substantially simultaneous with the positive peak position of the acceleration at the time of the vibration of movable body 40. That is, a voltage of a sub-driving signal, which is higher than offset voltage V1, is applied to coil 22 when movable body 40 that has started vibration is displaced in a direction away from coil 22. For this reason, coil 22 can attract movable body 40, which is displaced in the direction away from coil 22, and apply braking to the displacement of movable body 40 to shorten a vibration attenuation period.

Note that, in view of the inductance of coil 22, the sub-driving signal may be controlled such that the position of the maximum value within one period of a sub-driving current, which flows through coil 22 due to the sub-driving signal, or a magnetic attraction force, which occurs in electromagnetic actuator 10 due to the sub-driving signal, is simultaneous or substantially simultaneous with the positive peak position of the velocity.

Further, in the case of the present embodiment, the sub-driving signal is a sine wave having, as the center value, offset voltage V1 offset from a zero voltage, and thus, it is possible to make a period, during which a one-cycle sub-driving signal is applied, longer than in a case where the sub-driving signal is a square wave. For example, in the present embodiment, the one-cycle sub-driving signal can be 0.7T or more and 1.3T or less where T is the vibration cycle of movable body 40. In other words, the period, during which a one-cycle sub-driving signal is applied, can be a period within the range of 0.7T or more and 1.3T or less. In a case where the sub-driving signal is a square wave, the period, during which the sub-driving signal is applied, is limited to the period within the range of 0.5T or less, but in a case where the sub-driving signal is an offset sine wave, the range in which a sub-driving signal can be applied is wider, and thus, the degree of freedom for adjustment of a vibration attenuation period increases.

As described above, in the present embodiment, control device 1 applies a main driving signal to coil 22 of electromagnetic actuator 10, and then applies, to coil 22 of electromagnetic actuator 10, a sub-driving signal, such as a sine wave, which has a variable voltage that varies in a curvilinear waveform with offset voltage V1 as the center value.

According to the present embodiment configured in this way, an attraction force that varies curvilinearly at a predetermined value or more acts over the entire period of the vibration cycle, and thus, the attraction force does not vary discontinuously and it is possible to suppress the generation of a harmonic due to a discontinuous variation in the attraction force. Since a harmonic superimposed on the acceleration waveform of vibration is suppressed in this way, it is possible to suppress the generation of an unpleasant haptic feeling and an abnormal noise.

Note that, as an electromagnetic actuator, there is a linear resonant actuator (LRA) that includes a coil and a magnet, supplies a driving signal of a sine wave to the coil, and causes a movable body to be linearly driven in a reciprocating manner at a resonance frequency in cooperation with the magnet. In the present embodiment, electromagnetic actuator 10 driven by control device 1 does not include a magnet, unlike the LRA. Nonetheless, control device 1 applies a sub-driving signal such as a sine wave to a side of electromagnetic actuator 10 as with the LRA, and therefore can obtain an acceleration property equivalent to that of the LRA.

Further, according to the present embodiment, electromagnetic actuator 10 does not use a magnet or the like, and thus, it is possible to achieve a cost reduction, and it is possible to express vibrations of various touch operation feelings while achieving a cost reduction for the entire apparatus. Further, according to the present embodiment, it is possible to achieve an output increase with efficient driving, even for a small product. In addition, it is possible to efficiently generate a thrust of a movable body 40 suitable for a haptic feeling to the operator who operates the operation device while achieving a cost reduction for the apparatus.

Further, in the present embodiment, vibrations serving as various touch operation feelings are not adjusted with a damping material such as rubber, and thus, there is neither a single vibration attenuation period, nor a limitation on the types of operation feelings to be expressed with limited variations in vibration attenuation periods, as with a damping material. Further, there is no change in the resonance frequency due to individual differences in damping materials, and its characteristics do not differ depending on products, either.

Note that, in the example described above, control device 1 uses a braking signal or an additional attenuation signal as the sub-driving signal, but may use a braking signal and an additional attenuation signal in combination. In this case, for the order and number of braking and additional attenuation signals, or the like, it is possible to combine various patterns in response to touch operations. Further, the amplitude, application time, and the like of a braking signal and an additional attenuation signal, including a main driving signal, may also be changed depending on touch operations, and various patterns can be combined including those described above.

[Variation 1]

Figure 18:
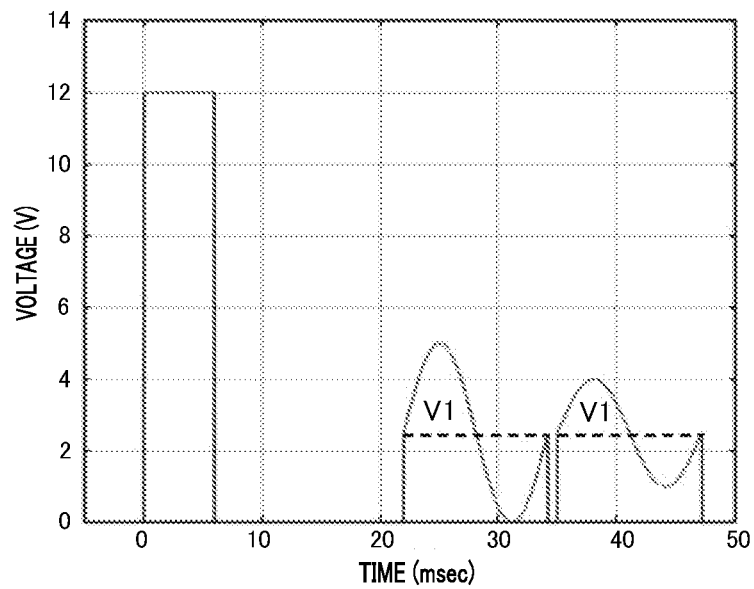
FIG. 18 is a graph illustrating a sub-driving signal different from the sub-driving signals illustrated in FIGS. 16 and 17 as Variation 1 of the embodiment of the present invention.

FIG. 18 is a graph illustrating a sub-driving signal different from the sub-driving signals illustrated in FIGS. 16 and 17 as Variation 1 of the embodiment described above.

In the example illustrated in FIG. 18, the main driving signal is a square wave as with the main driving signals illustrated in FIGS. 16 and 17.

In the example illustrated in FIG. 18, the sub-driving signal is basically a wave train of sine waves as with the sub-driving signal illustrated in FIG. 17. Specifically, the sub-driving signal is a wave train of sine waves having, as the center value, offset voltage V1 offset from a zero voltage. In the wave train of sine waves, the variable voltage varies curvilinearly in a range in which the polarity of the variable voltage does not change, and the basic waveform thereof is a one-cycle sine wave with the initial phase of 0 (see FIG. 12A).

Further, in FIG. 18, the amplitude of the sub-driving signal in each cycle is gradually reduced as with the sub-driving signal illustrated in FIG. 17, but it is configured such that offset voltage V1 is not applied during a period during which no sub-driving signal is applied.

In FIGS. 16 and 17, offset voltage V1 is also applied during a period during which no sub-driving signal is applied, that is, during a period between a main driving signal and a sub-driving signal. When such offset voltage V1 is applied, corresponding offset current I1 flows through coil 22 during the period of the application of offset voltage V1, power consumption increases, and heat generation in coil 22 increases.

In the present variation, in order to reduce power consumption and to suppress heat generation in coil 22, control device 1 stops the application of offset voltage V1 during a period during which no sub-driving signal is applied, for example, during a period between a main driving signal and a sub-driving signal and during a period between sub-driving signals.

Control device 1 may be configured as described in the embodiment described above (see FIGS. 10 and 11), but in the present variation, control device 1 stops the application of offset voltage V1 during a period during which no sub-driving signal is applied, as described above.

Since control device 1 stops the application of the offset voltage during a period during which no sub-driving signal is applied in the present variation as described above, it is possible to reduce power consumption and to suppress heat generation in coil 22.

Further, even in the present variation, control device 1 applies a main driving signal, and then applies, as a sub-driving signal, a wave train of sine waves having a variable voltage that varies with, as the center value, offset voltage V1 offset from a zero voltage.

In the present variation, as illustrated in FIG. 18, the application of offset voltage V1 is stopped during the period between the sub-driving signal in the first cycle and the sub-driving signal in the second cycle. During this period, the current flowing through coil 22 is in a state of gradually decreasing from the sub-driving current generated by the application of the sub-driving signal in the first cycle and is not zero. Further, even in the sub-driving current in the present variation, there is no discontinuous variation in the waveform indicating changes in the variable current thereof.

When such a sub-driving current flows through coil 22, an attraction force that varies curvilinearly at a predetermined value or more acts on movable body 40 over the entire period of the vibration cycle. Thus, since the attraction force varies curvilinearly at a predetermined value or more, that is, since no discontinuous variation in the attraction force is caused to occur, it is possible to suppress the generation of a harmonic due to a discontinuous variation in the attraction force. Accordingly, the generation of a harmonic superimposed on the acceleration waveform of the vibration of movable body 40 can be suppressed as in the embodiment described above. Thus, the present variation can also attain the same effect as the embodiment described above.

Note that, in the case of the present variation, the application of the offset voltage is stopped during a period during which no sub-driving signal is applied. Accordingly, the one-cycle sub-driving signal is caused to be greater than 0.5T and less than 1.0T where T is the vibration cycle of movable body 40. Assuming that the one-cycle sub-driving signal is 0.5T or less, a sub-driving current generated by the application of a sub-driving signal may gradually decrease and may become zero until the next sub-driving signal is applied. For this reason, the one-cycle sub-driving signal is preferably caused to be greater than 0.5T and less than 1.0T, and is further preferably caused to be 0.7T or more and less than 1.0T.

[Variation 2]

Figure 19:
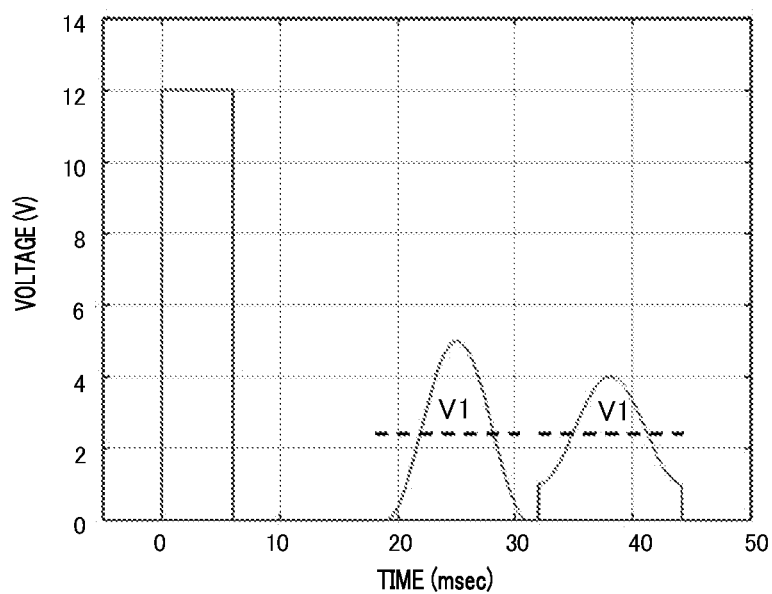
FIG. 19 is a graph illustrating a sub-driving signal different from the sub-driving signals illustrated in FIGS. 16 and 17 as Variation 2 of the embodiment of the present invention.

FIG. 19 is a graph illustrating a sub-driving signal different from the sub-driving signals illustrated in FIGS. 16 and 17 as Variation 2 of the embodiment described above.

In the example illustrated in FIG. 19, the main driving signal is a square wave as with the main driving signals illustrated in FIGS. 16 and 17.

In the example illustrated in FIG. 19, the sub-driving signal is a wave train of sine waves different in phase and/or the like from the sub-driving signal illustrated in FIG. 17. Specifically, the sub-driving signal is a wave train of sine waves having, as the center value, offset voltage V1 offset from a zero voltage. In the wave train of sine waves, the variable voltage varies curvilinearly in a range in which the polarity of the variable voltage does not change. In the present variation, on the other hand, the basic waveform of the sub-driving signal is a one-cycle sine wave with the initial phase of $3/2\pi$ (see FIG. 12B).

Further, in FIG. 19, the amplitude of the sub-driving signal in each cycle is gradually reduced as with the sub-driving signal illustrated in FIG. 17, but it is configured such that offset voltage V1 is not applied during a period during which no sub-driving signal is applied.

As described above, even in the present variation, in order to reduce power consumption and to suppress heat generation in coil 22, control device 1 stops the application of offset voltage V1 during a period during which no sub-driving signal is applied, as in Variation 1.

Control device 1 may be configured as described in the embodiment described above (see FIGS. 10 and 11), but in the present variation, control device 1 also stops the application of offset voltage V1 during a period during which no sub-driving signal is applied, as described above.

In addition, since control device 1 also stops the application of the offset voltage during a period during which no sub-driving signal is applied, for example, during a period between a main driving signal and a sub-driving signal and during a period between sub-driving signals in the present variation, it is possible to reduce power consumption and to suppress heat generation in coil 22.

Further, even in the present variation, control device 1 applies a main driving signal, and then applies, as a sub-driving signal, a wave train of sine waves having a variable voltage that varies with, as the center value, offset voltage V1 offset from a zero voltage.

In the present variation, as illustrated in FIG. 19, the application of offset voltage V1 is also stopped during the period between the sub-driving signal in the first cycle and the sub-driving signal in the second cycle. During this period, the current flowing through coil 22 is in a state of gradually decreasing from the sub-driving current generated by the application of the sub-driving signal in the first cycle and is not zero. Further, even in the sub-driving current in the present variation, there is no discontinuous variation in the waveform indicating changes in the variable current thereof.

When such a sub-driving current flows through coil 22, an attraction force that varies curvilinearly at a predetermined value or more acts on movable body 40 over the entire period of the vibration cycle. Thus, since the attraction force varies curvilinearly at a predetermined value or more, that is, since no discontinuous variation in the attraction force is caused to occur, it is possible to suppress the generation of a harmonic due to a discontinuous variation in the attraction force. Accordingly, the generation of a harmonic superimposed on the acceleration waveform of the vibration of movable body 40 can be suppressed as in the embodiment described above. Thus, the present variation can also attain the same effect as the embodiment described above.

Note that, even in the case of the present variation, the one-cycle sub-driving signal is preferably caused to be greater than 0.5T and less than 1.0T and is further preferably caused to be 0.7T or more and less than 1.0T, as in Variation 1 described above, where T is the vibration cycle of movable body 40.

[Variation 3]

Figure 20:
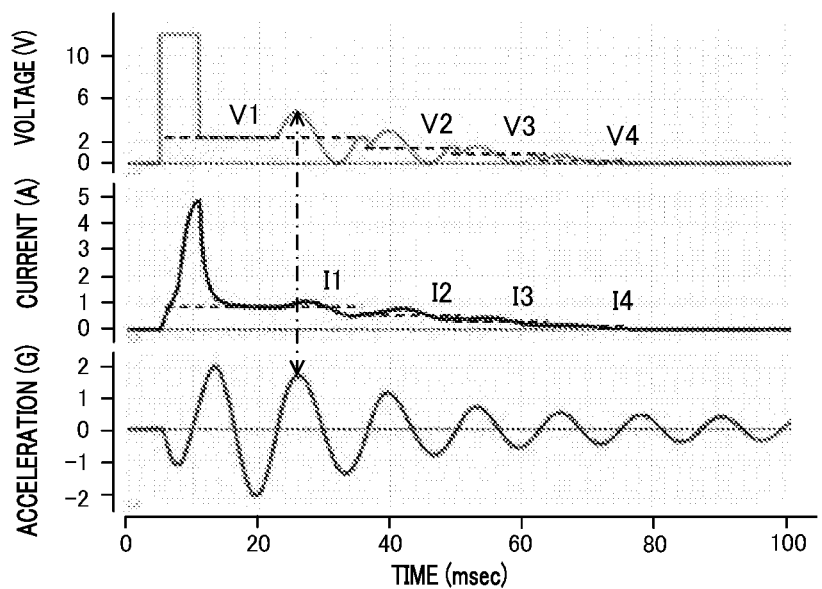
FIG. 20 is a graph provided for describing a case where a sub-driving signal (braking signal) different from the sub-driving signal illustrated in FIG. 17 is applied from the control device as Variation 3 of the embodiment of the present invention.

FIG. 20 is a graph provided for describing a case where a sub-driving signal (braking signal) different from the sub-driving signal illustrated in FIG. 17 is applied from control device 1 as Variation 3 of the embodiment described above.

In the example illustrated in FIG. 20, the main driving signal is a square wave as with the main driving signal illustrated in FIG. 17.

In the example illustrated in FIG. 20, the sub-driving signal is basically a wave train of sine waves as with the sub-driving signal illustrated in FIG. 17. Specifically, the sub-driving signal is a wave train of sine waves having a variable voltage that varies curvilinearly in a range in which the polarity of the variable voltage does not change, and the basic waveform thereof is a one-cycle sine wave with the initial phase of 0 (see FIG. 12A). In the present variation, on the other hand, the sub-driving signal is a wave train of sine waves with offset voltages V1 to V4 different for each cycle as the respective center values.

Further, in FIG. 20, the amplitude of the sub-driving signal in each cycle is gradually reduced as with the sub-driving signal illustrated in FIG. 17.

Control device 1 may be basically configured as described in the embodiment described above (see FIGS. 10 and 11). In the present variation, on the other hand, it is configured such that each of first sub-driving signal generating part B242 and second sub-driving signal generating part B243 of driving signal generating part 130 forms a wave train of sine waves in which the offset voltage changes for each cycle, unlike the embodiment described above.

In the example illustrated in FIG. 20, first sub-driving signal generating part B242 generates a wave train of sine waves having odd-numbered cycles (the first waveform in the present invention) while changing the offset voltage of the sine wave as V1→V3 for each cycle. Further, second sub-driving signal generating part B243 generates a wave train of sine waves having even-numbered cycles (the second waveform in the present invention) while changing the offset voltage of the sine wave as V2→V4 for each cycle. Then, synthesizing part B244 synthesizes the wave train of sine waves having odd-numbered cycles generated by first sub-driving signal generating part B242 and the wave train of sine waves having even-numbered cycles generated by second sub-driving signal generating part B243 to generate a wave train of a sub-driving signal as illustrated in FIG. 20.

As described above, in the present variation, control device 1 causes first sub-driving signal generating part B242, second sub-driving signal generating part B243, and synthesizing part B244 to generate a wave train of a sub-driving signal in which the offset voltage changes for each cycle. The same applies to Variations 4 and 5 to be described later.

It is also configured in the present variation such that power consumption is reduced and heat generation in coil 22 is suppressed as in Variation 1 and 2. For this reason, in the present variation, the offset voltage is lowered for each cycle of the sub-driving signal as described above.

Specifically, in the example illustrated in FIG. 20, the offset voltage from the main driving signal to the sub-driving signal in the first cycle is V1. Further, the offset voltage from the sub-driving signal in the first cycle to the sub-driving signal in the second cycle is V2 that is a voltage lower than V1. Further, the offset voltage from the sub-driving signal in the second cycle to the sub-driving signal in the third cycle is V3 that is a voltage lower than V2. Further, the offset voltage from the sub-driving signal in the third cycle to the sub-driving signal in the fourth cycle is V4 that is a voltage lower than V3.

As described above, control device 1 applies a sub-driving signal of a wave train of sine waves to a side of coil 22, while lowering the offset voltage for each cycle of the sub-driving signal, so as to realize V1>V2>V3>V4. For example, control device 1 may lower the offset voltage stepwise such that the offset voltage eventually becomes zero.

By lowering the offset voltage of the sub-driving signal for each cycle, the offset current corresponding to the offset voltage also gradually lowers as I1>I2>I3>I4 as illustrated in FIG. 20.

As described above, in the present variation, control device 1 lowers the offset voltage for each cycle of the sub-driving signal, and thus, it is possible to reduce power consumption and to suppress heat generation in coil 22.

The present variation is preferred in a case where the sub-driving signal is a braking signal. For this reason, control device 1 causes, as the supply timing, the position of the maximum value of the waveform within one cycle of the sub-driving signal (the peak value of the crest side) to be simultaneous or substantially simultaneous with the positive peak position of the acceleration at the time of the vibration of movable body 40 (see the arrows in the one-dot chain line in FIG. 20).

Note that, in view of the inductance of coil 22, the sub-driving signal may be controlled such that the position of the maximum value within one period of a sub-driving current, which flows through coil 22 due to the sub-driving signal, or a magnetic attraction force, which occurs in electromagnetic actuator 10 due to the sub-driving signal, is simultaneous or substantially simultaneous with the positive peak position of the velocity.

Further, even in the present variation, control device 1 applies a main driving signal, and then applies, as a sub-driving signal, a wave train of sine waves having a variable voltage that varies with offset voltages V1 to V4 as the respective center values.

For this reason, as illustrated in FIG. 20, the sub-driving current flowing through coil 22 becomes, in response to a variation in the variable voltage in the sub-driving signal of the sine wave, a variable current that changes with offset currents I1 to I4 corresponding to offset voltages V1 to V4, respectively, as the respective center values. In FIG. 20, the waveform indicating changes in this variable current is curvilinear and there is no discontinuous variation. In fact, in the sub-driving current illustrated in FIG. 20, unlike the sub-driving current illustrated in FIG. 14, there is no discontinuous variation in the waveform indicating changes in the variable current.

As described above, when a sub-driving current having a variable current that changes with offset currents I1 to I4 as the respective center values flows through coil 22, an attraction force that varies curvilinearly at a predetermined value or more acts on movable body 40 over the entire period of the vibration cycle. Thus, since the attraction force varies curvilinearly at a predetermined value or more, that is, since no discontinuous variation in the attraction force is caused to occur, it is possible to suppress the generation of a harmonic due to a discontinuous variation in the attraction force. In FIG. 20, no harmonic superimposed on the acceleration waveform of the vibration of movable body 40 appears and the generation of a harmonic can be suppressed. Thus, the present variation can also attain the same effect as the embodiment described above.

[Variation 4]

Figure 21:
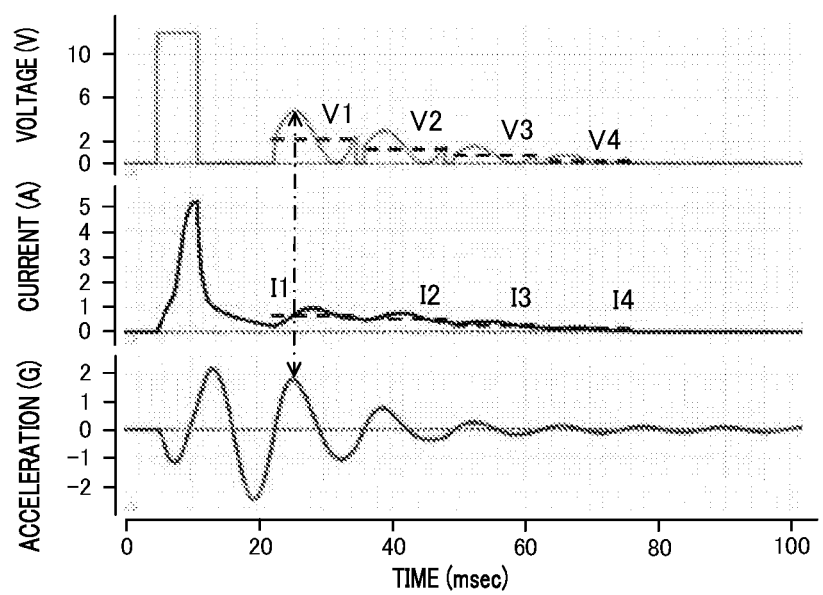
FIG. 21 is a graph provided for describing a case where a sub-driving signal (braking signal) different from the sub-driving signal illustrated in FIG. 17 is applied from the control device as Variation 4 of the embodiment of the present invention.

FIG. 21 is a graph provided for describing a case where a sub-driving signal (braking signal) different from the sub-driving signal illustrated in FIG. 17 is applied from control device 1 as Variation 4 of the embodiment described above.

In the example illustrated in FIG. 21, the main driving signal is a square wave as with the main driving signal illustrated in FIG. 17.

In the example illustrated in FIG. 21, the sub-driving signal is basically a sine wave as with the sub-driving signal illustrated in FIG. 17. Specifically, the sub-driving signal is a wave train of sine waves having a variable voltage that varies curvilinearly in a range in which the polarity of the variable voltage does not change, and the basic waveform thereof is a one-cycle sine wave with the initial phase of 0 (see FIG. 12A). In the present variation, on the other hand, the sub-driving signal is a wave train of sine waves with offset voltages V1 to V4 different for each cycle as the respective center values.

Further, in FIG. 21, the amplitude of the sub-driving signal in each cycle is gradually reduced as with the sub-driving signal illustrated in FIG. 17, but it is configured such that the offset voltage is not applied during a period during which no sub-driving signal is applied.

Control device 1 may be basically configured as described in the embodiment described above (see FIGS. 10 and 11). In addition, even in the present variation, control device 1 causes first sub-driving signal generating part B242, second sub-driving signal generating part B243, and synthesizing part B244 to generate a wave train of a sub-driving signal in which the offset voltage changes (lowers) for each cycle as in Variation 3 described above.

Further, it is configured in the present variation such that control device 1 does not apply the offset voltage during a period during which no sub-driving signal is applied, for example, during a period between a main driving signal and a sub-driving signal and during a period between sub-driving signals.

As described above, in the present variation, in order to reduce power consumption and to suppress heat generation in coil 22, control device 1 lowers the offset voltage for each cycle of the sub-driving signal, and further does not apply the offset voltage for a predetermined period.

Specifically, in the example illustrated in FIG. 21, the application of the offset voltage during the period between the main driving signal and the sub-driving signal in the first cycle is stopped, and the offset voltage of the sub-driving signal in the first cycle is V1. Further, the application of the offset voltage during the period between the sub-driving signal in the first cycle and the sub-driving signal in the second cycle is stopped, and the offset voltage of the sub-driving signal in the second cycle is V2 that is a voltage lower than V1. Further, the application of the offset voltage during the period between the sub-driving signal in the second cycle and the sub-driving signal in the third cycle is stopped, and the offset voltage of the sub-driving signal in the third cycle is V3 that is a voltage lower than V2. Further, the application of the offset voltage during the period between the sub-driving signal in the third cycle and the sub-driving signal in the fourth cycle is stopped, and the offset voltage of the sub-driving signal in the fourth cycle is V4 that is a voltage lower than V3.

As described above, control device 1 stops the application of the offset voltage during a period during which no sub-driving signal is applied, and applies a sub-driving signal of a wave train of sine waves to a side of coil 22, while lowering the offset voltage for each cycle of the sub-driving signal, so as to realize V1>V2>V3>V4. For example, control device 1 may lower the offset voltage stepwise such that the offset voltage eventually becomes zero.

By lowering the offset voltage of the sub-driving signal for each cycle, the offset current corresponding to the offset voltage also gradually lowers as I1>I2>I3>I4 as illustrated in FIG. 21.

In addition, control device 1 does not apply the offset voltage during a period during which no sub-driving signal is applied, for example, during a period between a main driving signal and a sub-driving signal and during a period between sub-driving signals.

As described above, since control device 1 lowers the offset voltage for each cycle of the sub-driving signal and stops the application of the offset voltage during a period during which no sub-driving signal is applied in the present variation, it is possible to further reduce power consumption and to further suppress heat generation in coil 22.

The present variation is preferred in a case where the sub-driving signal is a braking signal. For this reason, control device 1 causes, as the supply timing, the position of the maximum value of the waveform within one cycle of the sub-driving signal (the peak value of the crest side) to be simultaneous or substantially simultaneous with the positive peak position of the acceleration at the time of the vibration of movable body 40 (see the arrows in the one-dot chain line in FIG. 21).

Note that, in view of the inductance of coil 22, the sub-driving signal may be controlled such that the position of the maximum value within one period of a sub-driving current, which flows through coil 22 due to the sub-driving signal, or a magnetic attraction force, which occurs in electromagnetic actuator 10 due to the sub-driving signal, is simultaneous or substantially simultaneous with the positive peak position of the velocity.

Further, even in the present variation, control device 1 applies a main driving signal, and then applies, as a sub-driving signal, a wave train of sine waves having a variable voltage that varies with offset voltages different for each cycle as the respective center values.

Even in the present variation, the application of the offset voltage is stopped during the period between the main driving signal and the sub-driving signal in the first cycle and during each period between sub-driving signals as illustrated in FIG. 21. During these periods, the current flowing through coil 22 is in a state of gradually decreasing from the sub-driving current generated by the application of the main driving signal and the sub-driving signal and is not zero. Further, even in the sub-driving current in the present variation, there is no discontinuous variation in the waveform indicating changes in the variable current thereof.

When such a sub-driving current flows through coil 22, an attraction force that varies curvilinearly at a predetermined value or more acts on movable body 40 over the entire period of the vibration cycle. Thus, since the attraction force varies curvilinearly at a predetermined value or more, that is, since no discontinuous variation in the attraction force is caused to occur, it is possible to suppress the generation of a harmonic due to a discontinuous variation in the attraction force. Accordingly, the generation of a harmonic superimposed on the acceleration waveform of the vibration of movable body 40 can be suppressed as in the embodiment described above. Thus, the present variation can also attain the same effect as the embodiment described above.

[Variation 5]

Figure 22:
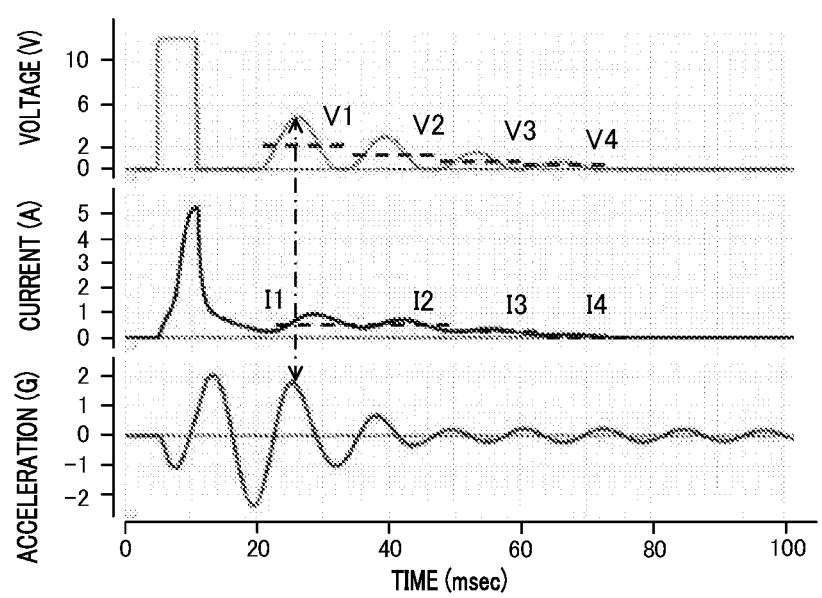
FIG. 22 is a graph provided for describing a case where a sub-driving signal (braking signal) different from the sub-driving signal illustrated in FIG. 17 is applied from the control device as Variation 5 of the embodiment of the present invention.

FIG. 22 is a graph provided for describing a case where a sub-driving signal (braking signal) different from the sub-driving signal illustrated in FIG. 17 is applied from control device 1 as Variation 5 of the embodiment described above.

In the example illustrated in FIG. 22, the main driving signal is a square wave as with the main driving signal illustrated in FIG. 17.

In the example illustrated in FIG. 22, the sub-driving signal is a sine wave different in phase and/or the like from the sub-driving signal illustrated in FIG. 17. Specifically, the sub-driving signal is a wave train of sine waves having a variable voltage that varies curvilinearly in a range in which the polarity of the variable voltage does not change. In the present variation, on the other hand, the sub-driving signal is a wave train of sine waves with offset voltages V1 to V4 different for each cycle as the respective center values, and the basic waveform thereof is a one-cycle sine wave with the initial phase of $3/2\pi$ (see FIG. 12B).

Further, in FIG. 22, the amplitude of the sub-driving signal in each cycle is gradually reduced as with the sub-driving signal illustrated in FIG. 17, but it is configured such that the offset voltage is not applied during a period during which no sub-driving signal is applied.

Control device 1 may be basically configured as described in the embodiment described above (see FIGS. 10 and 11). In addition, even in the present variation, control device 1 causes first sub-driving signal generating part B242, second sub-driving signal generating part B243, and synthesizing part B244 to generate a wave train of a sub-driving signal in which the offset voltage changes (lowers) for each cycle as in Variation 3 described above.

Further, in the case of the present variation, control device 1 generates a wave train of a sub-driving signal by using a one-cycle sine wave with the initial phase of $3/2\pi$ as the basic waveform of the sub-driving signal. For this reason, as described with FIG. 13, portions at which a sine wave having an odd-numbered cycle switches to a sine wave having an even-numbered cycle and portions at which a sine wave having an even-numbered cycle switches to a sine wave having an odd-numbered cycle can have a smooth waveform (see FIG. 13).

Even in the present variation, in order to reduce power consumption and to suppress heat generation in coil 22, control device 1 lowers the offset voltage for each cycle of the sub-driving signal, and further does not apply the offset voltage for a predetermined period, as in Variation 4.

Specifically, in the example illustrated in FIG. 22, the application of the offset voltage during the period between the main driving signal and the sub-driving signal in the first cycle is stopped, and the offset voltage of the sub-driving signal in the first cycle is V1. Further, the offset voltage of the sub-driving signal in the second cycle is V2 that is a voltage lower than V1. Further, the offset voltage of the sub-driving signal in the third cycle is V3 that is a voltage lower than V2. Further, the offset voltage of the sub-driving signal in the fourth cycle is V4 that is a voltage lower than V3.

As described above, control device 1 stops the application of the offset voltage during a period during which no sub-driving signal is applied, and applies a sub-driving signal of a wave train of sine waves to a side of coil 22, while lowering the offset voltage for each cycle of the sub-driving signal, so as to realize V1>V2>V3>V4. For example, control device 1 may lower the offset voltage stepwise such that the offset voltage eventually becomes zero.

By lowering the offset voltage for each cycle of the sub-driving signal, the offset current corresponding to the offset voltage also gradually lowers as I1>I2>I3>I4 as illustrated in FIG. 22.

In addition, control device 1 does not apply the offset voltage during a period during which no sub-driving signal is applied, for example, during a period between a main driving signal and a sub-driving signal.

As described above, since control device 1 lowers the offset voltage for each cycle of the sub-driving signal and stops the application of the offset voltage during a period during which no sub-driving signal is applied in the present variation, it is possible to further reduce power consumption and to further suppress heat generation in coil 22.

The present variation is preferred in a case where the sub-driving signal is a braking signal. For this reason, control device 1 causes, as the supply timing, the position of the maximum value of the waveform within one cycle of the sub-driving signal (the peak value of the crest side) to be simultaneous or substantially simultaneous with the positive peak position of the acceleration at the time of the vibration of movable body 40 (see the arrows in the one-dot chain line in FIG. 22).

Note that, in view of the inductance of coil 22, the sub-driving signal may be controlled such that the position of the maximum value within one period of a sub-driving current, which flows through coil 22 due to the sub-driving signal, or a magnetic attraction force, which occurs in electromagnetic actuator 10 due to the sub-driving signal, is simultaneous or substantially simultaneous with the positive peak position of the velocity.

Further, even in the present variation, control device 1 applies a main driving signal, and then applies, as a sub-driving signal, a wave train of sine waves having a variable voltage that varies with offset voltages different for each cycle as the respective center values.

In the present variation, a wave train of a sub-driving signal is generated by using a one-cycle sine wave with the initial phase of $3/2\pi$ as described with FIG. 13, and thus, each voltage between sub-driving signals becomes zero or substantially zero as illustrated in FIG. 22. Even when each voltage between sub-driving signals becomes zero or substantially zero as described above, the current flowing through coil 22 is in a state of gradually decreasing from the sub-driving current generated by the application of the sub-driving signal and is not zero. Further, even in the sub-driving current in the present variation, there is no discontinuous variation in the waveform indicating changes in the variable current thereof.

When such a sub-driving current flows through coil 22, an attraction force that varies curvilinearly at a predetermined value or more acts on movable body 40 over the entire period of the vibration cycle. Thus, since the attraction force varies curvilinearly at a predetermined value or more, that is, since no discontinuous variation in the attraction force is caused to occur, it is possible to suppress the generation of a harmonic due to a discontinuous variation in the attraction force. Accordingly, the generation of a harmonic superimposed on the acceleration waveform of the vibration of movable body 40 can be suppressed as in the embodiment described above. Thus, the present variation can also attain the same effect as the embodiment described above.

[Variation 6]

Figure 23:
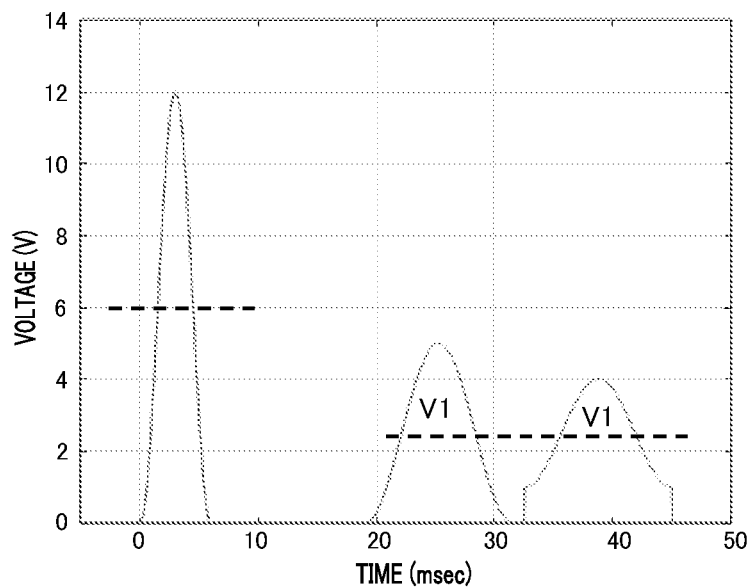
FIG. 23 is a graph further illustrating a main driving signal different from the main driving signal illustrated in FIG. 19 as Variation 6 of the embodiment of the present invention.

FIG. 23 is a graph illustrating a main driving signal different from the main driving signal illustrated in FIG. 19 as Variation 6 of the embodiment described above.

In the example illustrated in FIG. 23, the sub-driving signal is a sine wave (or a cosine wave) as with the sub-driving signal illustrated in FIG. 19. Since the sub-driving signal in the present variation is as described with FIG. 19, a redundant description will be omitted here. The main driving signal in the example illustrated in FIG. 23, on the other hand, is not a square wave, but a sine wave (or a cosine wave).

Since a sub-driving signal as a sine wave (or a cosine wave) is used as described above, the present variation can also attain the same effect as the embodiment described above. Further, since a main driving signal as a sine wave (or a cosine wave) and a sub-driving signal as a sine wave (or a cosine wave) are combined in the present variation, control device 1 can give a smoother haptic feeling to the operator by using vibration presenting apparatus 200.

Note that, in the present variation, the main driving signal is not limited to a sine wave or a cosine wave, but may be a triangle wave or a sawtooth wave.

[Variation 7]

Figure 24:
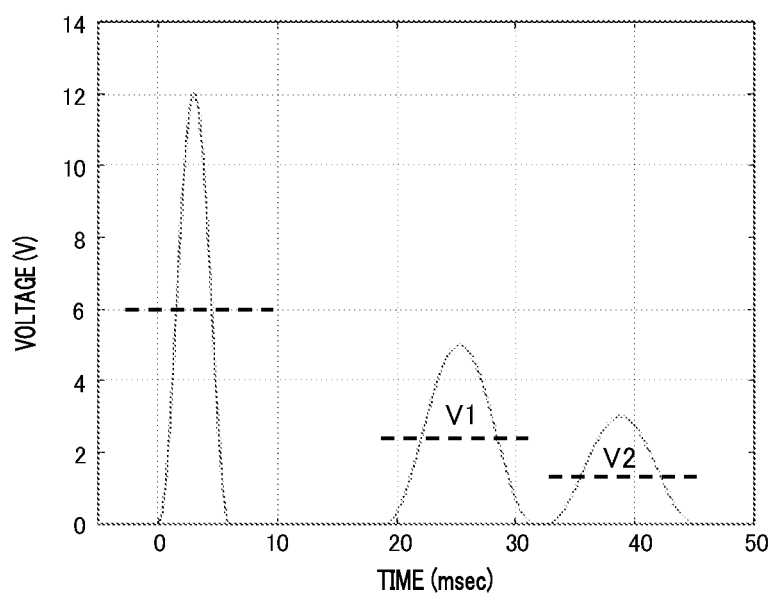
FIG. 24 is a graph further illustrating a sub-driving signal different from the sub-driving signal illustrated in FIG. 23 as Variation 7 of the embodiment of the present invention.

FIG. 24 is a graph illustrating a sub-driving signal different from the sub-driving signal illustrated in FIG. 23 as Variation 7 of the embodiment described above.

In the example illustrated in FIG. 24, the main driving signal is not a square wave, but a sine wave (or a cosine wave) as in FIG. 23. The sub-driving signal in the example illustrated in FIG. 24, on the other hand, is a sine wave (or a cosine wave), but is a wave train of sine waves (or cosine waves) with offset voltages V1 and V2 different for each cycle as the respective center values as with the sub-driving signal illustrated in FIG. 20. Further, the amplitude of the sub-driving signal in the present variation in each cycle is gradually reduced as with the sub-driving signal illustrated in FIG. 20. Since the sub-driving signal in the present variation is as described with FIG. 20, a redundant description will be omitted here.

Since a sub-driving signal as a sine wave (or a cosine wave) is used as described above, the present variation can also attain the same effect as the embodiment described above. Further, since a main driving signal as a sine wave (or a cosine wave) and a sub-driving signal as a sine wave (or a cosine wave) are combined in the present variation, control device 1 can give a smoother haptic feeling to the operator by using vibration presenting apparatus 200.

Note that, even in the present variation, the main driving signal is not limited to a sine wave or a cosine wave, but may be a triangle wave or a sawtooth wave.

[Variation 8]

Figure 25:
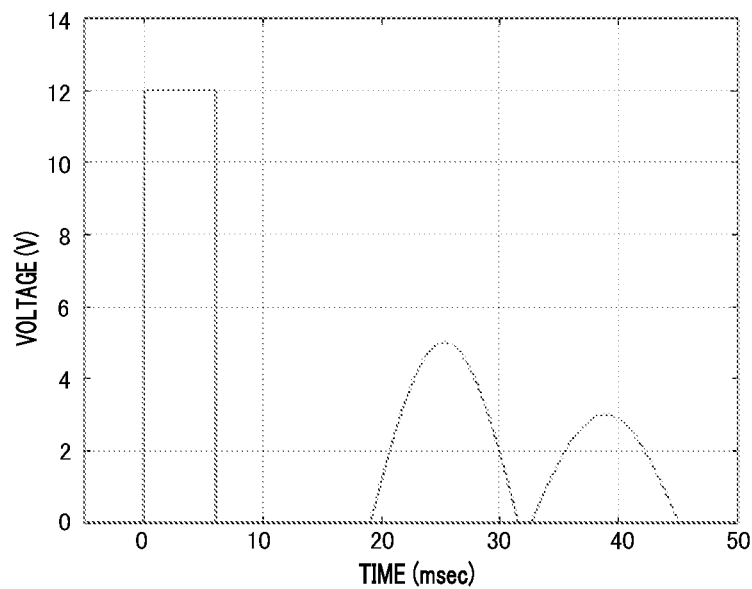
FIG. 25 is a graph further illustrating a sub-driving signal different from the sub-driving signal illustrated in FIG. 19 as Variation 8 of the embodiment of the present invention.

FIG. 25 is a graph illustrating a sub-driving signal different from the sub-driving signal illustrated in FIG. 19 as Variation 8 of the embodiment described above.

In the example illustrated in FIG. 25, the main driving signal is a square wave as with the main driving signals illustrated in FIGS. 16 and 17. The sub-driving signal in the example illustrated in FIG. 25, on the other hand, is a wave train of sine waves, but half sine waves having an amplitude different for each period and a frequency of ½ (for a half cycle starting from the initial phase of 0 to the phase of π). The half sine wave having a frequency of ½ corresponds to one cycle of an offset cosine wave, and the half sine wave with a frequency of ½ can be used instead of an offset one-cycle cosine wave.

The sub-driving signal in the present variation is also a wave train of sine waves (or cosine waves) having a variable voltage that varies curvilinearly in a range in which the polarity of the variable voltage does not change. Further, it is configured such that the amplitude of the sub-driving signal in the present variation in each cycle is also gradually reduced and the offset voltage is not applied during a period during which no sub-driving signal is applied. Such a sub-driving signal in the present variation is substantially the same as the sub-driving signal illustrated in FIG. 22.

Since a sub-driving signal as a sine wave (or a cosine wave) is used as described above, the present variation can also attain the same effect as the embodiment described above.

[Variation 9]

Figure 26:
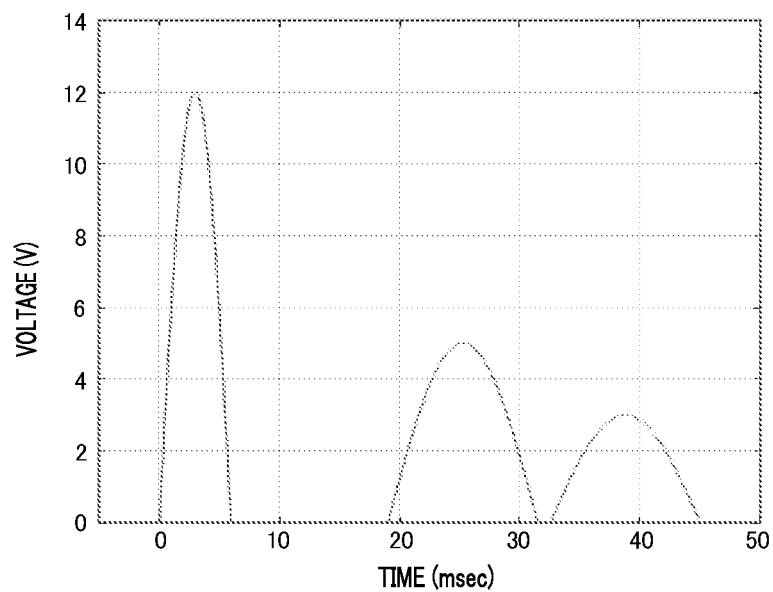
FIG. 26 is a graph further illustrating a main driving signal different from the main driving signal illustrated in FIG. 25 as Variation 9 of the embodiment of the present invention.

FIG. 26 is a graph illustrating a main driving signal different from the main driving signal illustrated in FIG. 25 as Variation 9 of the embodiment described above.

In the example illustrated in FIG. 26, the sub-driving signal is a sine wave (or a cosine wave) as with the sub-driving signal illustrated in FIG. 25. The main driving signal in the example illustrated in FIG. 26, on the other hand, is not a square wave, but a sine wave (or a cosine wave).

Since a sub-driving signal as a sine wave (or a cosine wave) is used as described above, the present variation can also attain the same effect as the embodiment described above. Further, since a main driving signal as a sine wave (or a cosine wave) and a sub-driving signal as a sine wave (or a cosine wave) are combined in the present variation, control device 1 can give a smoother haptic feeling to the operator by using vibration presenting apparatus 200.

Note that, even in the present variation, the main driving signal is not limited to a sine wave or a cosine wave, but may be a triangle wave or a sawtooth wave.

[Variation 10]

Figure 27:
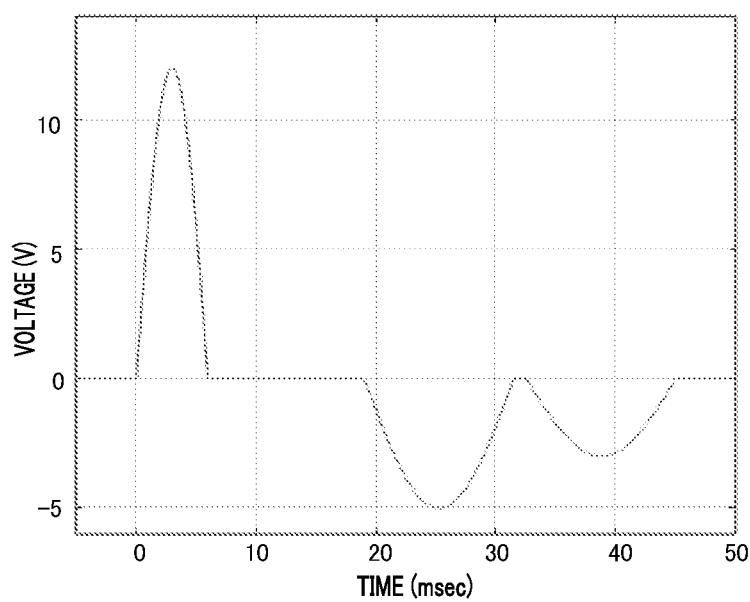
FIG. 27 is a graph further illustrating a sub-driving signal different from the sub-driving signal illustrated in FIG. 26 as Variation 10 of the embodiment of the present invention.

FIG. 27 is a graph illustrating a sub-driving signal different from the sub-driving signal illustrated in FIG. 26 as Variation 10 of the embodiment described above.

In the example illustrated in FIG. 27, the main driving signal is not a square wave, but a sine wave (or a cosine wave) as in FIG. 26. In the example illustrated in FIG. 27, on the other hand, the sub-driving signal is a sine wave (or a cosine wave) as in FIG. 26. The sub-driving signal in the example illustrated in FIG. 26, however, is the voltage of the same sign as that of the main driving signal (positive voltage), whereas the sub-driving signal in the example illustrated in FIG. 27 is the voltage of a sign different from that of the main driving signal (negative voltage).

Although the positive and negative voltages are reversed, the sub-driving signal in the present variation is a wave train of sine waves (or cosine waves) having a variable voltage that varies curvilinearly in a range in which the polarity of the variable voltage does not change. Further, it is configured such that the amplitude of the sub-driving signal in the present variation in each cycle is also gradually reduced and the offset voltage is not applied during a period during which no sub-driving signal is applied. Thus, although the positive and negative voltages are reversed, the sub-driving signal in the present variation is substantially the same as the sub-driving signal illustrated in FIG. 22.

Since a sub-driving signal as a sine wave (or a cosine wave) is used as described above, the present variation can also attain the same effect as the embodiment described above. Further, since a main driving signal as a sine wave (or a cosine wave) and a sub-driving signal as a sine wave (or a cosine wave) are combined in the present variation, control device 1 can give a smoother haptic feeling to the operator by using vibration presenting apparatus 200.

Note that, even in the present variation, the main driving signal is not limited to a sine wave or a cosine wave, but may be a triangle wave or a sawtooth wave.

[Variation 11]

Figure 28:
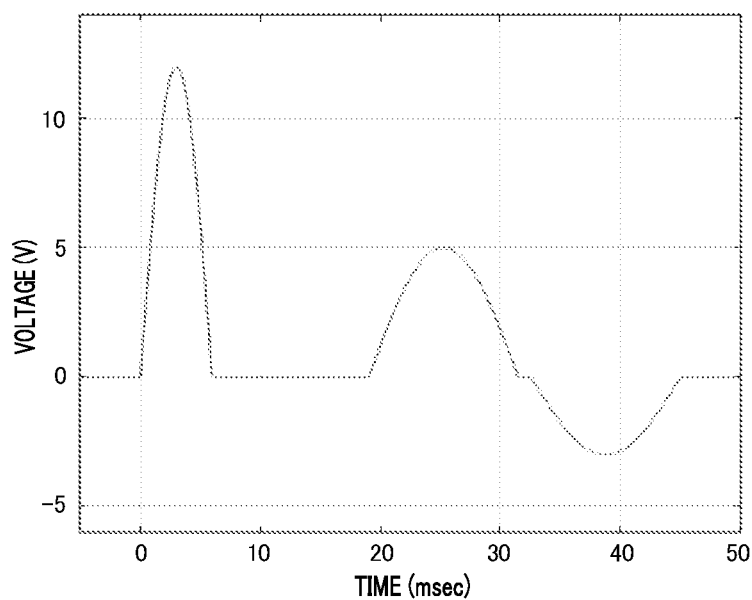
FIG. 28 is a graph further illustrating a sub-driving signal different from the sub-driving signal illustrated in FIG. 26 as Variation 11 of the embodiment of the present invention.

FIG. 28 is a graph illustrating a sub-driving signal different from the sub-driving signal illustrated in FIG. 26 as Variation 11 of the embodiment described above.

In the example illustrated in FIG. 28, the main driving signal is not a square wave, but a sine wave (or a cosine wave) as in FIG. 26. Further, in the example illustrated in FIG. 28, the sub-driving signal is a sine wave (or a cosine wave) as in FIG. 26. The sub-driving signal in the example illustrated in FIG. 26, however, is the voltage of the same sign as that of the main driving signal (positive voltage), whereas in the sub-driving signal in the example illustrated in FIG. 28, a signal having the voltage of the same sign as that of the main driving signal (positive voltage) and a signal having the voltage of a sign different from that of the main driving signal (negative voltage) are combined. As exemplified in FIG. 28, the voltage of the sub-driving signal in the present variation may be changed alternately in the order of the positive voltage and the negative voltage for each cycle or may be changed alternately in the order of the negative voltage and the positive voltage for each cycle, or the sign of the voltage may be changed randomly for each cycle.

Although the positive and negative of the voltage are different in each cycle, the sub-driving signal in the present variation is, within one cycle, a wave train of a sine wave (or a cosine wave) having a variable voltage that varies curvilinearly in a range in which the polarity of the variable voltage does not change. Further, it is configured such that the absolute value of the amplitude of the sub-driving signal in the present variation in each cycle is also gradually reduced and the offset voltage is not applied during a period during which no sub-driving signal is applied. Thus, although the positive and negative of the voltage are different, the sub-driving signal in the present variation is substantially the same as the sub-driving signal illustrated in FIG. 22 since the magnetic attraction force is correlated with the absolute value of the voltage (current).

Since a sub-driving signal as a sine wave (or a cosine wave) is used as described above, the present variation can also attain the same effect as the embodiment described above. Further, since a main driving signal as a sine wave (or a cosine wave) and a sub-driving signal as a sine wave (or a cosine wave) are combined in the present variation, control device 1 can give a smoother haptic feeling to the operator by using vibration presenting apparatus 200.

Note that, even in the present variation, the main driving signal is not limited to a sine wave or a cosine wave, but may be a triangle wave or a sawtooth wave.

The embodiment of the present invention has been described thus far. Note that, the above description is only an exemplification of a preferred embodiment of the present invention, and the scope of the present invention is not limited thereto. That is, the descriptions of the configuration of the apparatus and the shape of each portion are examples, and it is apparent that various modifications and additions to these examples are possible in the scope of the invention.

In the present embodiment, the driving direction of the electromagnetic actuator driven and controlled by control device 1 is the Z direction, but is not limited thereto. Even when the driving direction of the electromagnetic actuator is the direction parallel to the contact surface of the operator, specifically, the X direction or the Y direction, it is possible to attain the effects such as efficient driving and strengthened vibration described above.

INDUSTRIAL APPLICABILITY

The electromagnetic actuator according to the present invention exhibits an effect capable of expressing vibrations of various touch operation feelings. For example, in in-vehicle products and industrial devices, the electromagnetic actuator according to the present invention is useful for an operation device into which the operator inputs an operation by bringing his/her finger into contact with an image on a screen. In particular, the electromagnetic actuator according to the present invention is useful for an operation device such as a touch display apparatus in which a touch screen apparatus capable of feeding back an operation feeling similar to an operation feeling when the operator comes into contact with various images, such as a mechanical switch, displayed on a screen is mounted, for example.

REFERENCE SIGNS LIST

1 Control device
10 Electromagnetic actuator
20 Core assembly
20a, 20b Counter surface (counter surface part)
22 Coil
24 Core
26 Bobbin
30 Fixing body
32 Base part
32a Attachment part
32b Bottom surface part
33 Fastening hole
36 Opening part
40 Movable body
41 Yoke
42 Surface-part fixing hole
44 Surface-part fixing part
44a Fixing surface
46, 47 Attracted surface part
48 Opening part
49 Notch
50 Plate-shaped elastic part (elastic support part)
52 Fixing-body side fixing part
54 Movable-body side fixing part
56 Elastic arm part
70 Strain detecting sensor
82 Switching element
84 Signal generating part
110 Power supply part
120 Detection signal processing part
121 HPF
122 LPF
130 Driving signal generating part
140 Driving part
141 Gate driver
142 MOSFET
143 SBD
200 Vibration presenting apparatus
241 Core main body
242, 244 Magnetic pole part
321, 322 Fixing hole
B21 Main driving signal generating part
B22 Timing detecting part
B23 Amplitude setting part
B24 Sub-driving signal setting part
B241 Cycle counting part
B242 First sub-driving signal setting part
B243 Second sub-driving signal setting part
B244 Synthesizing part
B25 Output part

The invention claimed is:

1. A control device that controls an electromagnetic actuator, the electromagnetic actuator driving an operation device in one direction of a vibration direction of the operation device to vibrate the operation device, the operation device being supported in an elastically vibratable manner by an elastic support part, wherein
the control device includes a circuit, the circuit applying a main driving signal to a coil of the electromagnetic actuator to start vibration of the operation device in response to a touch operation on the operation device, the circuit then applying a sub-driving signal to the coil to adjust an attenuation period of the vibration,
the sub-driving signal has a variable voltage, the variable voltage varying with an offset voltage as a center value, the offset voltage being offset from a zero voltage, a waveform that indicates a variation in the variable voltage being a sine function curve or a cosine function curve, and
the circuit stops application of the offset voltage during at least one of a period between the main driving signal and the sub-driving signal and/or a period between a plurality of the sub-driving signals.

2. The control device according to claim 1, wherein:
the circuit supplies a sub-driving current to the coil by applying the sub-driving signal, and
the sub-driving current is a variable current changing in response to a variation in the variable voltage, a waveform that indicates a change in the variable current being a sine function curve or a cosine function curve.

3. A control device that controls an electromagnetic actuator, the electromagnetic actuator driving an operation device in one direction of a vibration direction of the operation device to vibrate the operation device, the operation device being supported in an elastically vibratable manner by an elastic support part, wherein
the control device includes a circuit, the circuit applying a main driving signal to a coil of the electromagnetic actuator to start vibration of the operation device in response to a touch operation on the operation device, the circuit then applying a sub-driving signal to the coil to adjust an attenuation period of the vibration,
the sub-driving signal has a variable voltage, the variable voltage varying with an offset voltage as a center value, the offset voltage being offset from a zero voltage, a waveform that indicates a variation in the variable voltage being a sine function curve or a cosine function curve, and the sub-driving signal is a sine wave or a cosine wave, the sine wave or the cosine wave having the variable voltage that varies in a range in which a polarity of the variable voltage does not change.

4. The control device according to claim 3, wherein one cycle of the sub-driving signal is 0.7 times or more and 1.3 times or less a vibration cycle of the operation device.

5. The control device according to claim 3, wherein a position of a maximum value in one period of a sub-driving current or a magnetic attraction force is simultaneous or substantially simultaneous with a positive peak position of a velocity at a time of the vibration of the operation device, the sub-driving current flowing through the coil due to the sub-driving signal, the magnetic attraction force occurring in the electromagnetic actuator due to the sub-driving signal.

6. The control device according to claim 3, wherein a position of a maximum value in one period of a sub-driving current or a magnetic attraction force is simultaneous or substantially simultaneous with a negative peak position of a velocity at a time of the vibration of the operation device, the sub-driving current flowing through the coil due to the sub-driving signal, the magnetic attraction force occurring in the electromagnetic actuator due to the sub-driving signal.

7. The control device according to claim 3, wherein the sub-driving signal is a sine wave starting from an initial phase of $3/2\pi$ or a cosine wave starting from an initial phase of $\pi$.

8. The control device according to claim 3, wherein the sub-driving signal is a half sine wave starting from an initial phase of 0 to a phase of $\pi$.

9. A vibration presenting apparatus, comprising:
an electromagnetic actuator that drives an operation device in one direction of a vibration direction of the operation device to vibrate the operation device, the operation device being supported in an elastically vibratable manner by an elastic support part; and
the control device according to claim 1.

10. The vibration presenting apparatus according to claim 9, wherein:
the electromagnetic actuator includes an electromagnet and a yoke, the electromagnetic including the coil, the yoke being formed of a magnetic material, and
the electromagnetic actuator drives the operation device in the one direction with magnetic attraction between the electromagnet and the yoke, the magnetic attraction being generated by application of a driving signal to the coil.

* * * * *